United States Patent
Romand et al.

(10) Patent No.: US 11,857,104 B2
(45) Date of Patent: Jan. 2, 2024

(54) EXCHANGEABLE CARTRIDGE FOR BEVERAGE PORTION DISPENSER

(71) Applicant: SOCIETE DES PRODUITS NESTLE S.A., Vevey (CH)

(72) Inventors: Damien Romand, Grenoble (FR); Etienne Crozier, La Neuveville (CH); Marco Magatti, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 703 days.

(21) Appl. No.: 16/956,302

(22) PCT Filed: Dec. 19, 2018

(86) PCT No.: PCT/EP2018/085717
§ 371 (c)(1),
(2) Date: Jun. 19, 2020

(87) PCT Pub. No.: WO2019/121834
PCT Pub. Date: Jun. 27, 2019

(65) Prior Publication Data
US 2020/0323386 A1    Oct. 15, 2020

(30) Foreign Application Priority Data
Dec. 22, 2017    (EP) .................................... 17210543

(51) Int. Cl.
*A47J 31/40*    (2006.01)
*B65D 85/804*    (2006.01)
*A47J 31/44*    (2006.01)

(52) U.S. Cl.
CPC .......... *A47J 31/407* (2013.01); *B65D 85/804* (2013.01); *A47J 31/4403* (2013.01)

(58) Field of Classification Search
CPC .......... A47J 31/00; A47J 31/40; A47J 31/407; A47J 31/4403; B65D 83/04; B65D 83/06;
(Continued)

(56) References Cited

U.S. PATENT DOCUMENTS

| 3,812,273 A | 5/1974 | Schmidt |
|---|---|---|
| 6,347,651 B2 | 2/2002 | Jeannin et al. |

(Continued)

FOREIGN PATENT DOCUMENTS

| EP | 1247481 | 10/2002 |
|---|---|---|
| EP | 1295553 | 3/2003 |

(Continued)

OTHER PUBLICATIONS

Russia Patent Office Communication for Application No. 2020123277/03(040163), dated Mar. 17, 2022, 12 pages.

*Primary Examiner* — Nathaniel E Wiehe
*Assistant Examiner* — Theodore J Evangelista
(74) *Attorney, Agent, or Firm* — K&L Gates LLP

(57) ABSTRACT

Exchangeable cartridge (3) for portion dispenser (1) arranged for storing and dispensing beverage items (8) for the preparation of beverages comprising: an elongated hollowed storage member (7) comprising an interior for accommodating a plurality of beverage items (8), comprising a closed end (9) and an open end (10) comprising an exit opening (11), a closure cap (14) adapted to connect in a removable manner to the elongated hollowed storage member (7) at the open end of the storage member and to be sealed through a removable complementary connection (15) of the storage member (7) and closure cap (14), wherein the closure cap (14) comprises a locking member (26), or respectively keying member, being arranged for complementarily fitting with a keying member (25), or respectively a locking member, of the portion dispenser (1) and for (Continued)

allowing the closure cap (14) to be removed from the elongated hollowed member (7) and to be re-connected to the elongated hollowed member (7).

17 Claims, 15 Drawing Sheets

(58) Field of Classification Search
CPC .. B65D 85/62; B65D 85/804; B65D 85/8046; B65D 85/8052; B65D 85/8064; B65D 85/8067
See application file for complete search history.

(56) References Cited

U.S. PATENT DOCUMENTS

| | | |
|---|---|---|
| 8,328,032 B2 | 12/2012 | Gong |
| 8,844,428 B2 | 9/2014 | Kollep et al. |
| 9,775,463 B2 | 10/2017 | Jarisch et al. |
| 10,993,576 B2 | 5/2021 | Fedorak et al. |
| 2003/0145736 A1 | 8/2003 | Green |
| 2003/0146237 A1 | 8/2003 | Costa |
| 2005/0061158 A1* | 3/2005 | Della Pietra ........ A47J 31/3633 99/279 |
| 2008/0250936 A1 | 10/2008 | Cortese |
| 2014/0076170 A1* | 3/2014 | Epars ....................... A47J 31/46 426/115 |
| 2014/0361016 A1* | 12/2014 | Moreau ................. B65D 47/42 426/115 |
| 2015/0099039 A1* | 4/2015 | Ferrier ............... B65D 85/8061 426/77 |
| 2016/0029832 A1* | 2/2016 | Iotti .................... A47J 31/3642 221/199 |
| 2016/0058226 A1* | 3/2016 | Christopoulos .... B65D 17/4011 220/254.1 |
| 2016/0257554 A1 | 9/2016 | Manwani et al. |
| 2018/0068515 A1* | 3/2018 | Edwards ................ G07F 13/065 |
| 2018/0263408 A1 | 9/2018 | Malkin et al. |

FOREIGN PATENT DOCUMENTS

| | | |
|---|---|---|
| JP | 2012050528 A | 3/2012 |
| RU | 30727 U1 | 7/2003 |
| WO | 2014135677 | 9/2014 |
| WO | 2016146793 | 9/2016 |

* cited by examiner

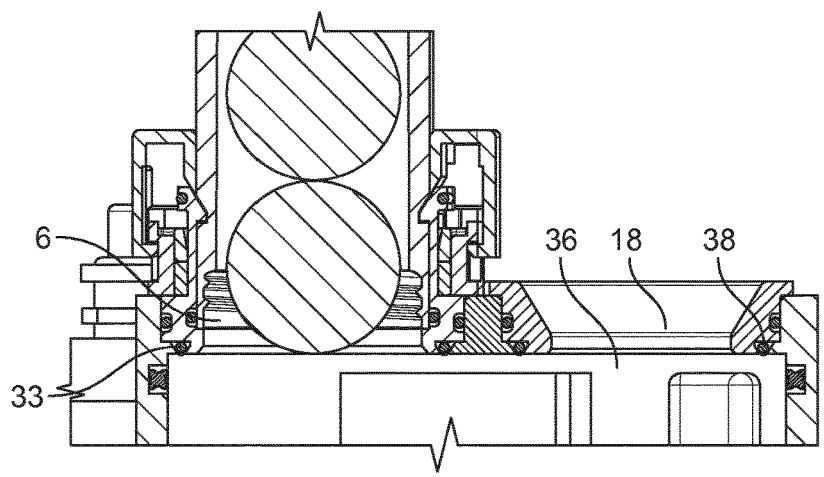
FIG. 13
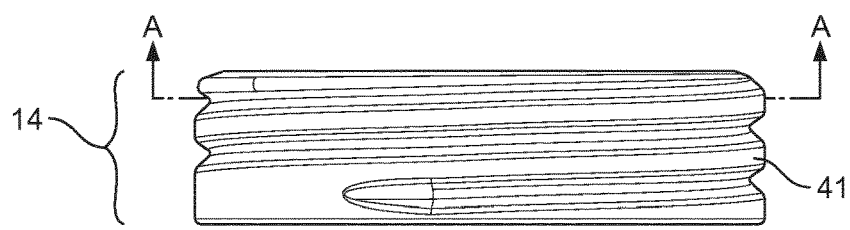
FIG. 14
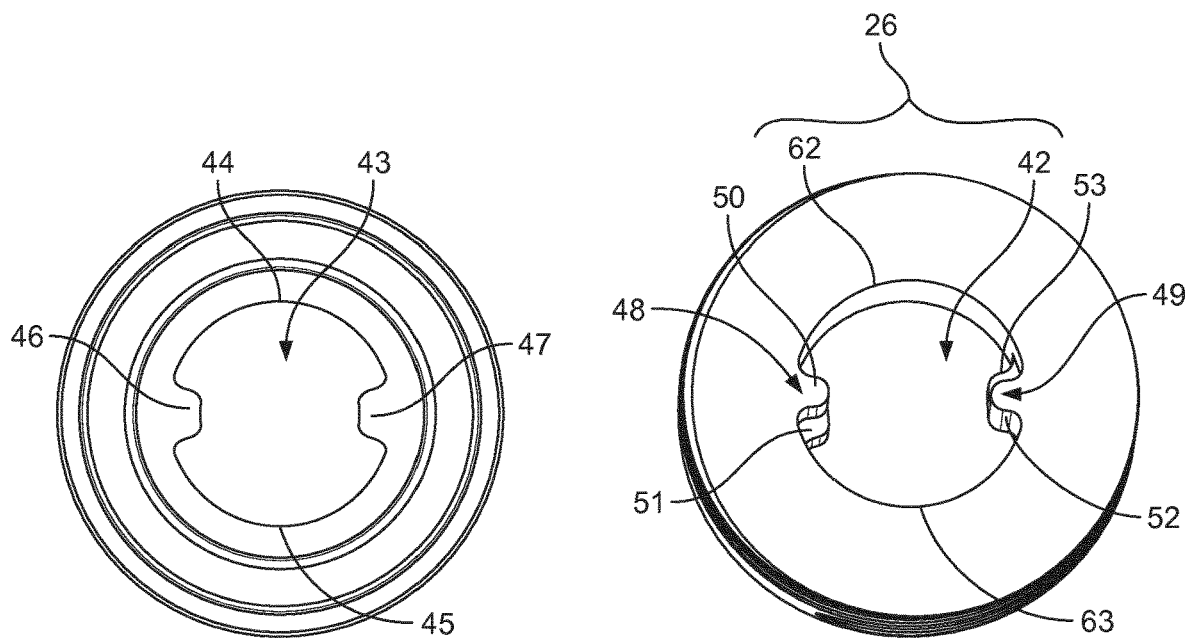
FIG. 15
FIG. 16

EXCHANGEABLE CARTRIDGE FOR BEVERAGE PORTION DISPENSER

CROSS REFERENCE TO RELATED APPLICATIONS

The present application is a National Stage of International Application No. PCT/EP2018/085717, filed on Dec. 19, 2018, which claims priority to European Patent Application No. 17210543.9, filed on Dec. 22, 2017, the entire contents of which are being incorporated herein by reference.

FIELD OF THE INVENTION

The invention relates to the storing and dispensing of portioned beverage items for the preparation of beverages using such beverage portioned items in a beverage preparation device such as a coffee machine for in-home or professional use.

BACKGROUND OF THE INVENTION

It is known that coffee is sold in airtight packages to protect it from contact with air that would cause quick oxidation and loss of aromas. The field of beverage closure capsules has developed tremendously essentially because each coffee portion can be well protected by a suitable gastight, functional package until coffee is extracted in a suitable coffee machine.

For example, EP0512468 and EP0512470 provide respectively a sealed beverage capsule and a process for extracting a beverage from such capsule.

U.S. Pat. Nos. 8,178,139 and 8,210,097 provide respectively a spherical capsule comprising compacted aggregate of substance to be infused and a packaging envelope impermeable to air and water and a machine for automatically preparing and dispensing a beverage from such sealed capsule by puncturing the packaging envelope. In particular, the capsules are stacked in a reservoir above the infusion chamber and selected individually by a rear yoke forming part of the infusion chamber.

FR2879175 provides a coffee dose for automatic beverage and dispensing machines comprising an infusion chamber and a tamping position for a determined quantity of ground coffee in the infusion chamber. The coffee dose can be compacted from roast and ground coffee to a rolling external shape, a substantially spherical ball. The coffee dose further comprises an envelope of at least one layer or film of porous material imprisoning the coffee aggregate.

WO2014135677 proposes a packaging for holding beverage ingredient capsules with an outer aperture hermetically sealed with a closure material and comprising oxygen-barrier and/or water vapour barrier properties and wherein the closure material is formed by at least a portion of a first closure capsule being arranged in vicinity of the outlet aperture of the packaging. A device for controlled dispensing of capsules containing beverage ingredients is also described wherein it comprises a discharge outlet for selectively dispensing the closure capsules and a barrier distribution area arranged within a closure capsule transport path and means for flushing inert gas in the capsule receiving chamber.

Other patents such as EP1879487 or US20110185908 relate to the dispensing of coffee powder from a dispenser including a storage container, shutter means and vacuum or inert gas supply to purge the dispensing chamber from oxygen.

In general, the portioned package solutions which are designed to well preserve the coffee ingredient against oxidation provide many advantages such as freshness, coffee quality by perfect dosing and controlled extraction. However, they are expensive to produce, are generally package material consuming and may require a sophisticated packaging recycling chain.

Most other dispensing coffee ingredient dispensing solutions especially for coffee powder in bulk pose dosing accuracy problems and provide complexity, bulkiness and cost in the maintenance of a controlled atmosphere inside the dispenser by requiring dedicated vacuum or inert gas production systems.

WO2014135677 has also the disadvantages of the maintenance of controlled atmosphere by a dedicated vacuum or inert gas production device. Also, the dispensing cartridge is complicated to produce and package consuming.

Therefore, a solution is sought after for providing a low cost, sustainable and simple exchangeable packaging to precisely and reliably dispense beverage product ingredient, e.g. roast and ground coffee, for the preparation of beverage while maintaining product ingredient as fresh as possible and reducing packaging material consumption.

The present invention aims at overcoming the above-outlined problem of the prior art. Furthermore, the invention aims at providing a solution to further problems identified in the description.

SUMMARY OF THE INVENTION

In a first aspect, the invention relates to an exchangeable cartridge for a portion dispenser arranged for storing and dispensing beverage portioned items for the preparation of beverages comprising:

an elongated hollowed storage member comprising an interior for accommodating a plurality of portioned beverage ingredient items (hereafter referred as "beverage items") comprising a closed end and an open end comprising an exit opening, a closure cap adapted to connect in a removable manner to the elongated hollowed storage member at the open end of the storage member and to be sealed to the elongated hollowed storage member through a removable complementary connection, wherein the closure cap comprises a locking member, or respectively a keying member, being arranged for complementarily fitting with a keying member, or respectively a locking member, of the portion dispenser and for allowing the closure cap to be removed from the elongated hollowed storage member when connected to the portion dispenser and to be re-connected to the elongated hollowed storage member before being disconnected from the portion dispenser.

The term "exchangeable" means that the cartridge in place in the portion dispenser can be removed from the portion dispenser in a closed state (with the cap reconnected to the cartridge) while all the beverage items have not all been dispensed without deteriorating the beverage items presents in the cartridge. Another cartridge (with beverage item for a different beverage) can then be connected to the portion dispenser.

Preferably, the elongated hollowed storage member is in the form of a tubular storage member.

The exit opening has preferably a size configured for allowing the dispensing of a single beverage item at a time or multiple beverage items at a time.

The closed end can be closed structurally or by specific closure means.

Preferably, the interior is protected from the ambient air and/or moisture such as by vacuum or inert oxygen-free gas and the elongated hollowed storage member and closure cap are sealingly closed in such a manner to prevent exchange of gas with ambient air when the closure cap is in connected position with the elongated hollowed storage member.

Additionally, the interior of the elongated hollowed storage member is protected from UV light in order to preserve the beverage items from the effects of UV light.

In particular, before any first removal of the closure cap, the interior is preferably substantially void of oxygen. The possible level of residual oxygen should be such that it roast and ground coffee is maintained substantially non-oxidized within a period of several days or weeks.

The invention essentially stems from the principle of minimizing the gas (and moisture) exchange between portioned items stored in group in the package and ambient air while selectively dispensing the item(s). One aspect lies on the ability to repeatedly, securely and automatically open for dispensing and re-sealing for storage the cartridge by the portioned product dispenser.

Preferably, the portioned beverage ingredient items (called hereafter "beverage items") are essentially spherical and essentially made of compacted powder, flakes, fibers, leaves, fruit pieces or a combination thereof. These features provide the advantages of easier handling, a precise dosing for preparing the beverage but also a resistance to oxidation due to the limited exchange surface conferred by the shape and the compaction of such shape.

In a preferred example, the portioned beverage item are preferably compacted coffee powder spherical shapes having a density between 0.5 and 1.2 $g/cm^3$, more preferably 0.65-1 $g/cm^3$. They may have a diameter of 20-30 mm, more preferably 25-28 mm and may have a weight between 5 and 10 gram, more preferably between 6 and 8 grams.

Preferably, the beverage items are essentially made of compacted roast and ground coffee. Preferably each beverage item is made of compacted powder having a density between 0.5 and 1.2 $g/cm^3$, more preferably 0.65 and 1 $g/cm^3$, most preferably 0.7 and 0.9 $g/cm^3$.

Alternatively, the beverage items are made of compacted soluble coffee or tea.

The term "essentially" means that more than 90% in weight of each item is made of the material considered.

The term "spherical" means a shape that is ball like or close to or equal to a sphere, considering the natural imperfections and roughness of the external surface as well as possible removal of small bit of the sphere or surface embossments (e.g. truncation).

In a proposed mode, the beverage items are free of non-food material cover (additional packaging layer). Therefore, the beverage items are not individually packed which considerably reduces the production cost and ensures a lower packaging consumption per cartridge. This may be, for example, the case for beverage items made of compacted coffee.

In an alternative, each beverage item can be covered by at least one containment layer made of bio-compostable or water dissolvable material. Preferably the material is porous or dissolved in contact with water. For example, each beverage item can be wrapped by a, preferably thin, envelope made of cellulose, polysaccharide or biodegradable polymer such as poly-lactic acid. The containment layer has essentially for function to maintain integrity of the compacted shape of the beverage item depending on the type of ingredient so that it reduces the risk of crumbling into small pieces or if it crumbles, the pieces remain contained inside the envelope. This may be, for example, the case for beverage items made of compacted tea/tea leaves.

The elongated hollowed storage member is preferably designed to receive a stack of beverage items. The elongated hollowed storage member has a cross-section which is dimensioned relative to the food item to allow storage of a single line of stacked beverage items in the cartridge. The first item in the stack is in contact with the inner surface of the closure cap and so it is capable of being discharged by gravity when the closure cap is removed, e.g. pulled up, by the locking member. The inner surface of the closure cap may be shaped with a concave surface to receive the first beverage item as the closure cap is removed. The closure cap may serve as a support means for the beverage item when moved to the dispensed area and/or dispensed by the portion dispenser.

The elongated hollowed member and closure cap can be formed of packaging material(s) comprising a barrier to oxygen such as EVOH or PVOH. In particular, before any first removal of the closure cap, the interior is preferably substantially void of oxygen.

In a proposed mode, the complementary connection of the closure cap and elongated hollowed storage member are connected in a force-fitting and/or form-fitting manner.

In one possible aspect, the complementary connection of the closure cap and elongated hollowed storage member comprises a thread of the closure cap arranged with a complementary thread of the elongated hollowed member.

An additional complementary connection could be a bayonnet connection.

The advantage lies in the easiness of removing the closure cap by the keying member of the external portion dispenser. In particular, the keying member can be provided with a spindle-type driving device which can rapidly unscrew the closure cap and re-screw the closure cap to open the end of the elongated hollowed member. Preferably, a seal member is provided between the closure cap and the elongated hollowed member. The seal member may be part of the complementary connection or an add-on to the complementary connection. The seal member is effective to prevent ingress of oxygen inside the cartridge. In a preferred mode, the seal member may comprise at least one flexible annular lip protruding from respectively the closure cap or elongated hollowed storage member and bearing on respectively the elongated hollowed storage member or closure cap. The seal member may comprise an add-on compressible annular ring such as an O-ring made of rubber, silicone, EPDM or thermoplastic elastomer.

In a preferred aspect, the locking member comprises a receiving cavity defining a receiving cavity for a terminal portion of the keying member and an entry passage for the selective insertion of the terminal portion of the keying member. The entry passage is preferably of smaller transversal cross-section than the transversal cross-section of the receiving cavity. Therefore, the risk of accidental or inappropriate removal of the closure cap is avoided. The removal of the closure cap can be properly controlled by the portion dispenser to ensure the opening of the cartridge for dispensing of a beverage item in a sealed confined area of the dispenser (e.g., in a limited volume in which the beverage item is trapped before or for transfer to the dispensing area)

and so where the potential volume of oxygen capable of entering the cartridge remains sufficiently low.

The receiving cavity of the locking member may comprise at least one first engagement surface, preferably first engagement surfaces arranged transversally and/or radially relative to the direction of extension of the elongated hollowed member for torque transmission by the terminal portion of the keying member for releasing the complementary connection of the closure cap and elongated hollowed member. In particular, when the complementary connection comprises a thread of the closure cap with a complementary thread of the elongated hollowed member, the engagement surfaces enable to transfer torque to unscrew the closure cap and detach it from the elongated hollowed member.

The locking member may further comprise at least one second engagement surface, preferably second engagement surfaces, transversally and/or radially arranged relative to the opening of the elongated hollowed storage member for torque transmission by the keying member for re-connecting the complementary connection of the closure cap and elongated hollowed member. Similarly, when the complementary connection comprises a thread of the closure cap with a complementary thread of the elongated hollowed member, the second engagement surfaces enable to transfer torque to screw the closure cap and re-connect it to the elongated hollowed member for sealingly closing the cartridge and avoiding further gas exchange with the ambient or vacuum reduction.

In a mode, the locking member comprises a receiving cavity with radially arranged first and second engagement surfaces as surface parts of two protrusions protruding internally from the receiving cavity towards the centre of the receiving cavity and positioned opposite to each other for being engaged selectively depending on the direction of rotation of the keying member. Again, such solution particularly fits with a threading connection of the closure cap and of the elongated hollowed member and can be easily actuated in two opposite rotational directions by a keying member driven by a dedicated spindle-type driving device.

In a second mode, the locking member comprises a receiving cavity of non-circular, preferably oblong transversal shape arranged for receiving an expandable terminal portion of the keying member. The locking member may further comprise an entry passage of smaller contour than the larger transversal dimension of the receiving cavity. Preferably, the entry passage is of circular contour. This mode is of particular simplicity for enabling, by automatic play compensation, a torque transmission from the keying member to the locking member in the two opposite directions (e.g. screwing and unscrewing directions).

The locking member may comprise an entry passage of circular opening which is smaller than the larger dimension of the non-circular preferably oblong receiving cavity thereby providing an inner shoulder enabling an axial engagement of the terminal portion of the keying member during removal of the closure cap.

In this mode, the terminal portion of the keying member of the dispenser device preferably comprises an expandable engaging member such as two separate disc halves capable of being inserted through the entry passage (e.g. circular) and of being moved apart transversally inside the receiving cavity to secure the keying member to the locking member of the closure cap.

In a third mode, the locking member comprises a hollow receiving cavity of deformable character and an entry passage of smaller transversal cross-section than the cross-section of the hollow receiving cavity and of the corresponding transversal cross section of the terminal portion of the keying member, for expanding the receiving cavity upon insertion of the terminal portion. The advantage of such solution is to obtain a closer match between the locking member of the cartridge and the keying member of the dispenser to reduce the plays and increase the torque transferred to the closure cap and facilitate both removal and re-connection. The motion speed of the closure cap can also be increased thereby reducing the loss of vacuum or protective atmosphere in the cartridge.

In particular, the locking member may comprise a receiving cavity with radially arranged first and second engagement surfaces forming longitudinally extending grooves, or respectively ribs, at its inner surface which are complementarily shaped with longitudinally extending ribs, respectively grooves at the outer surface of the terminal portion of the keying member. Again, fitting between the keying member and the locking member is improved. The motion speed of the closure cap can be further increased.

Additionally, the connection of the closure cap may further comprise on its outer tubular surface, outwardly oriented and retractable tongues, arranged for engaging complementarily shaped through-openings of the open end of the elongated hollowed storage member and the receiving cavity the locking member comprising an elastic actuation member arranged across the receiving cavity for being engaged by the terminal portion of the keying member to retract the tongues upon engagement in the receiving cavity. Therefore, a threading or a bayonet connection or a similar connection can be blocked until the tongues are retracted. The advantage is to further secure the closure of the cartridge thereby reducing the risk of accidental or inappropriate removal of the closure cap.

In another aspect, the elongated hollowed storage member comprises a recess or protrusion such as an annular groove arranged for removably connecting the elongated hollowed storage member to a latch member such as a hook-type elastically biased latch member of a receiving portion of the dispenser. The recess or protrusion is preferably positioned on an attachment portion of the storage elongated hollowed member that can fit with a complementary tubular surface of the receiving portion. The latch member of the receiving portion can be positioned in the tubular surface.

It should be noted that as a variant within the scope of the invention, the locking member can be part of the dispenser and the keying member can be part of the closure cap.

The invention also relates to a system comprising a beverage dispenser and an exchangeable cartridge as aforementioned.

More particularly, the invention relates to a system comprising an exchangeable cartridge and a portion dispenser, wherein the exchangeable cartridge comprises:
  an elongated hollowed storage member comprising an interior for accommodating a plurality of beverage items, comprising a closed end and an open end comprising an exit opening,
  a closure cap adapted to connect in a removable manner to the elongated hollowed storage member at the open end of the storage member and to be sealed to the storage elongated hollowed member through a removable complementary connection,
wherein the closure cap comprises a locking member, or respectively a keying member,
and wherein the portion dispenser comprises a keying member, or respectively a locking member, arranged for complementarily fitting with the locking member, or respectively a keying member of the closure cap and for allowing the closure cap to be removed from the elongated hollowed member and to be re-connected to the elongated hollowed member.

In a preferred aspect, the removable complementary connection comprises an arrangement of a thread of the closure cap and a complementary thread of the elongated hollowed storage member.

The invention further relates to a beverage preparation device comprising a portion dispenser or portion dispenser system as aforementioned.

BRIEF DESCRIPTION OF THE DRAWINGS

FIG. 5 shows a cross-sectional perspective view of the portioned dispenser system in the discharge position with the piston in extended position and the exchangeable cartridge sealed by its closure cap (i.e., before the selection and loading of a beverage item from the pile in the dispenser);

FIG. 6 shows a cross-sectional perspective view of the portioned dispenser system of the invention of FIG. 1 in the discharging position with a beverage item arranged in the discharge chamber before transfer to the dispensing area;

FIG. 7 shows a cross-sectional perspective view of the portioned dispenser system of the invention with a beverage item arranged in the discharge chamber with the piston in retracted position and after transfer in the dispensing position;

FIG. 8 shows a perspective view of the portioned dispenser system of the invention in the dispensing position with the piston in the extended position and a beverage item being dispensed in the dispensing area;

FIG. 13 is an enlarged cross-section view of FIG. 12;

FIG. 14 shows a side view of the closure cap of the exchangeable cartridge;

FIG. 15 is a bottom view of the closure cap of FIG. 14;

FIG. 16 is a perspective cross-section view in plane A-A of the closure cap of FIG. 14;

DETAILED DESCRIPTION OF THE PREFERRED EMBODIMENTS

Figure 1:
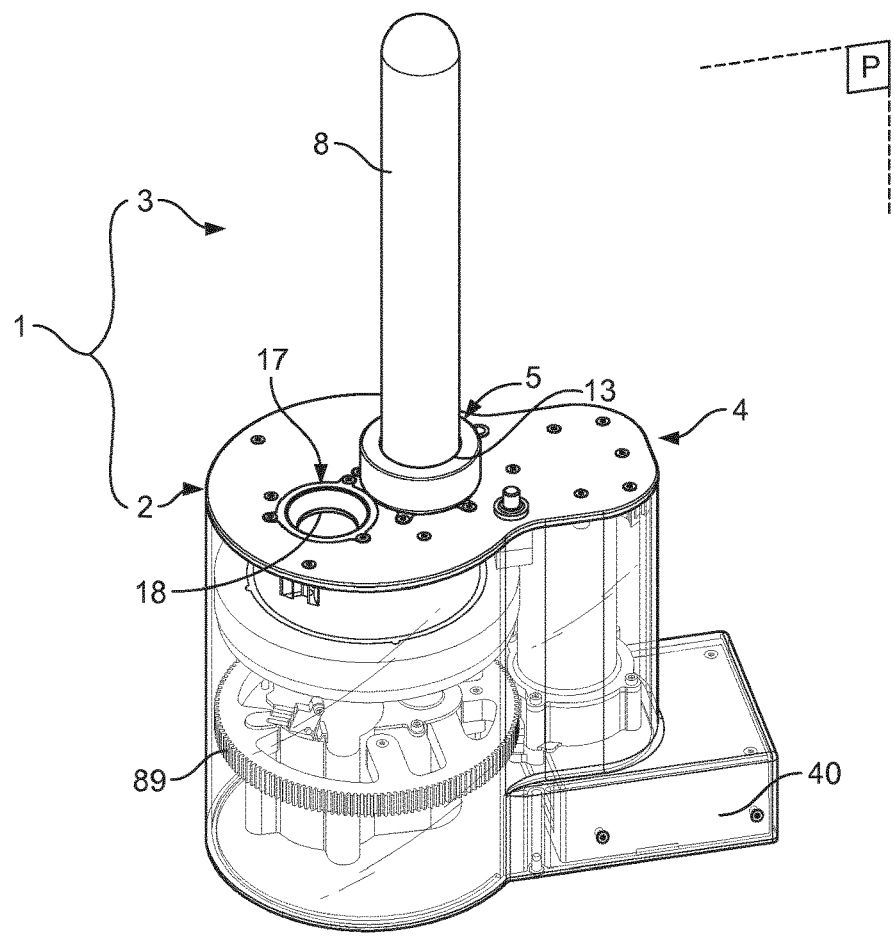
FIG. 1 shows a perspective view of the portioned dispenser system of the invention with an exchangeable cartridge assembled with the portion dispenser.

The invention relates to a portioned dispenser system 1 as illustrated in FIGS. 1 to 4 comprising a portion dispenser 2 and an exchangeable cartridge 3 according to the invention.

The portion dispenser 2 generally comprises a frame 4 having a receiving portion 5 for receiving the exchangeable cartridge. A discharge opening 6 may be provided in the receiving portion.

Figure 2:
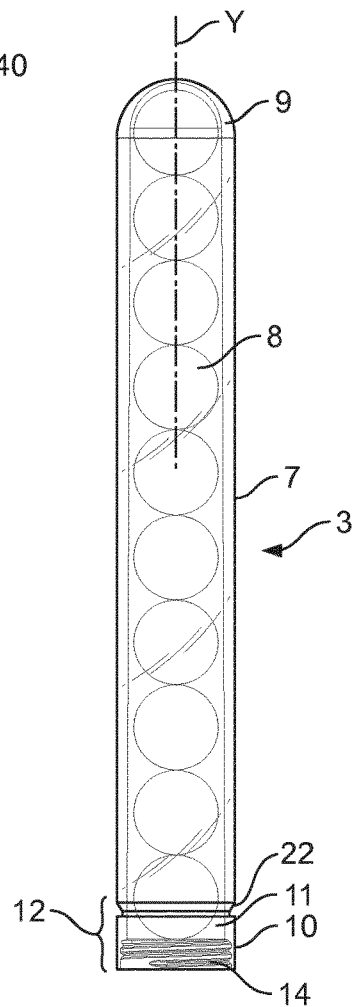
FIG. 2 shows a side view of an exchangeable cartridge of the invention.
Figure 3:
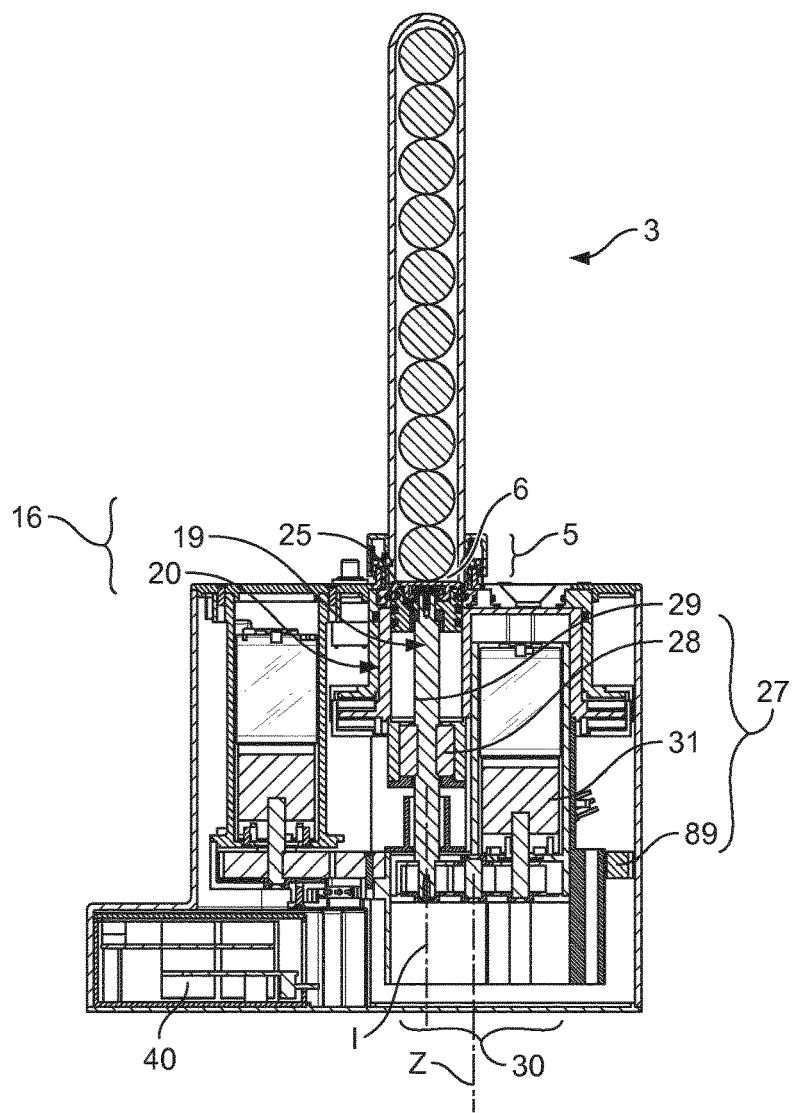
FIG. 3 shows a cross-section view in plane P of the portioned dispenser system of the invention of FIG. 1.
Figure 22:
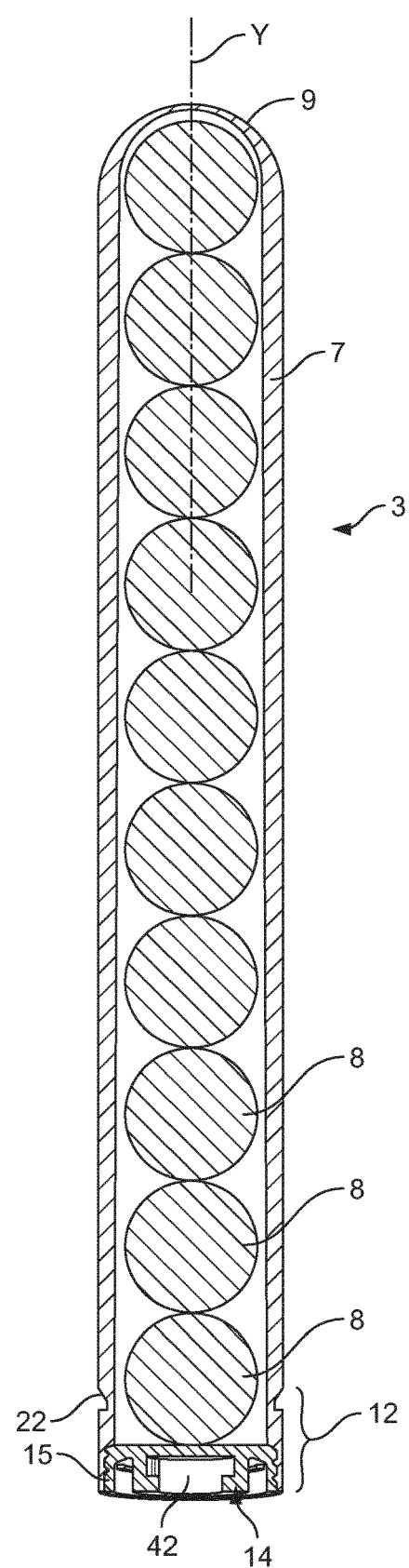
FIG. 22 shows a cross-section longitudinal view of the beverage item cartridge of FIG. 2.
Figure 23:
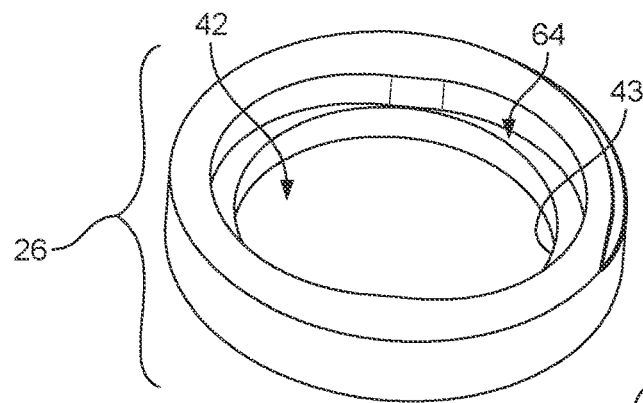
FIG. 23 is a cross-sectional perspective view of the closure cap of FIG. 14 according to a second embodiment.
Figure 24:
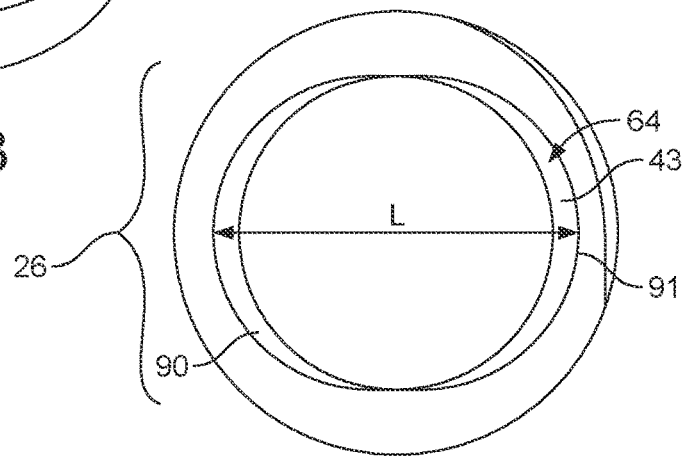
FIG. 24 is a plane view of the closure cap of FIG. 23.

A first embodiment of the cartridge of the invention is illustrated in FIGS. 2 and 22. The exchangeable cartridge 3 comprises an elongated hollowed storage member in the form of a tubular storage member 7 for storing beverage items 8 such as compacted balls of beverage ingredients. The beverage ingredients can comprise or be roast and ground coffee. The tubular storage member is preferably arranged to accommodate a pile of beverage items that when the exchangeable cartridge is received in the receiving portion 5 is arranged vertically thereby allowing the beverage item to be discharged individually and by gravity in the portion dispenser. The tubular storage member is preferably elongated and extends along a longitudinal axis (Y). In particular, the storage tubular member comprises a closed end 9 and an open end 10 comprising an exit opening 11 having a cross-section configured for allowing the dispensing of a single beverage item at a time. The tubular storage member 7 comprises an attachment portion 12 at or next to the exit opening 11 and connectable to at least one tubular surface 13 of the receiving portion 5 of the frame. Furthermore, a closure cap 14 is adapted to connect in a removable and sealable manner to the tubular storage member 7 at its open end 10. For this, a removable complementary connection 15 of the storage member and closure cap is provided. As will be discussed in more detail later, this removable connection can advantageously comprise a threading for enabling the closure cap to be removed by unscrewing it and be connected by screwing.

Preferably, the interior of the exchangeable cartridge has low oxygen content. More preferably, it is under vacuum or is saturated with inert oxygen-free gas such as carbon dioxide and/or nitrogen. The tubular storage member and the closure cap are preferably made of polymer and/or metal materials which are barrier to oxygen at least during several days or weeks. A gas sealing arrangement is also arranged between the protective cap 14 and the tubular storage member 7 such as by a gas sealing connection and/or by additional at least one seal member, e.g. a sealing lip or O-ring.

According to an aspect of the invention, the portion dispenser comprises a piston assembly 16 arranged for receiving a beverage item and transporting it to a dispensing area 17 of the frame that comprises a dispensing opening 18. The piston assembly essentially comprises a piston 19 reciprocally arranged in a piston housing 20. The piston is axially arranged with the discharge opening 6 and aligned with the longitudinal axis (Y) of the exchangeable cartridge when fitting in the receiving portion of the portion dispenser.

Figure 4:
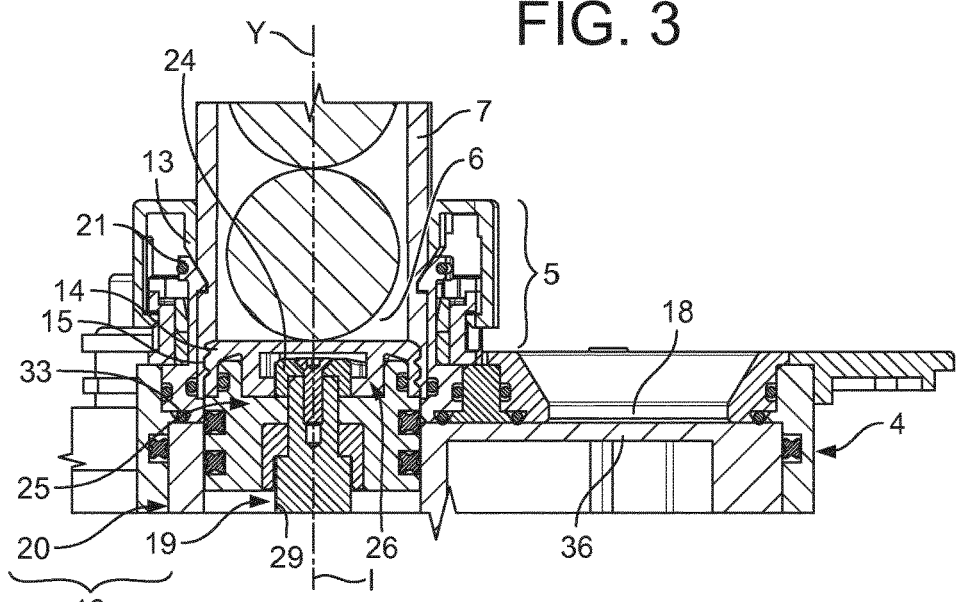
FIG. 4 is an enlarged view of FIG. 3 showing the interface between the exchangeable cartridge and the portion dispenser in the extended position of the piston.

The tubular surface 13 of the dispenser is arranged for coupling with the tubular member 7 of the exchangeable cartridge such that the cartridge is held in a substantial vertical arrangement thereby allowing the discharge of the beverage items by gravity in the dispenser. The receiving portion 5 may further comprise at least one elastic connection member 21 arranged for removably engaging a removable connection member of the tubular storage member of the exchangeable cartridge. As illustrated in FIG. 4, the removable connection member may be a hook-type connection member positioned inside the tubular surface 13 and resiliently arranged for engaging at least one recess or protrusion such as an annular complementary-shaped groove 22 of the tubular storage member. The hook-type latch member 21 may comprise at least one tooth with a substantially transversal surface engaged with the groove 22 to prevent upward axial movement of the cartridge. This connection enables to secure the exchangeable cartridge in place and further contributes to the sealing of the exchangeable cartridge with the receiving portion and to the stable alignment with the piston assembly. Of course, these connection means may take many other forms such as a spring-biased ring or a series of circumferentially distributed spring-biased beads. For example, the male part (e.g. hook-type member) may also be part of the cartridge and the female part (e.g. groove) may be provided inside the tubular surface 13.

Figure 6:
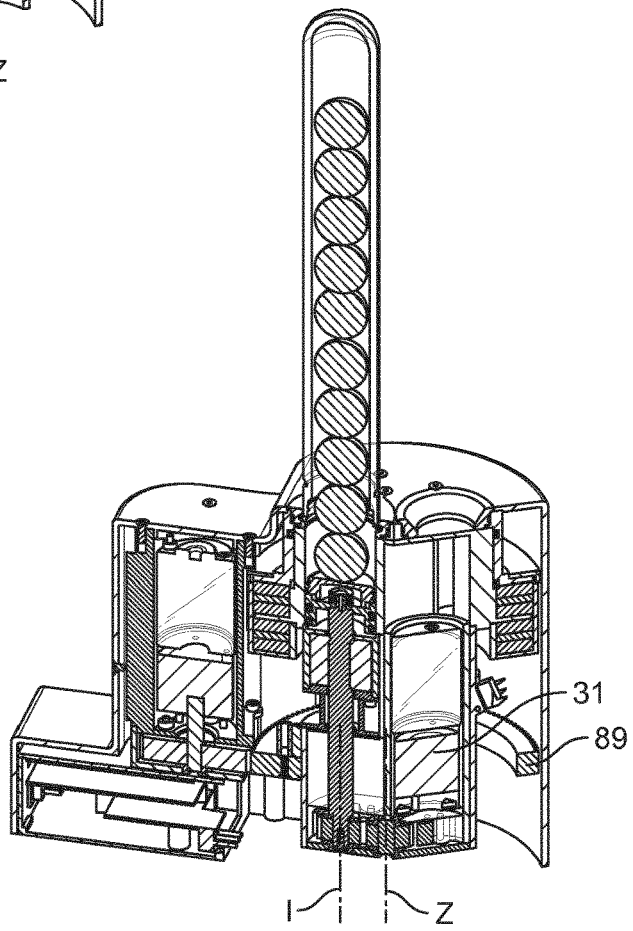
Figure 9:
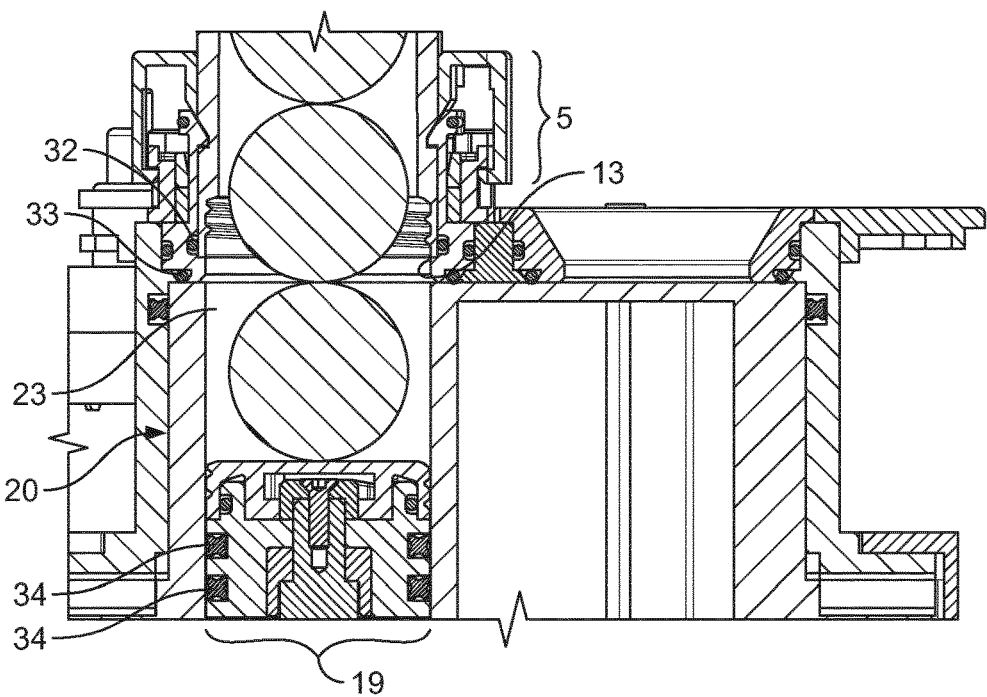
FIG. 9 is an enlarged cross-section view of FIG. 5.

The piston 19 is arranged in the piston housing 20 of the piston assembly 16 to move between an extended position in which the piston comes next to the discharge opening 6 (visible in FIGS. 3 and 4) and a retracted position in which a discharge chamber 23 is defined (visible in FIGS. 6 and 9).

The volume of the discharge chamber 23 is defined as a function of the retraction distance of the piston relative to the discharge opening 6. Such distance may be adjusted to the number and/or volume of beverage items to be discharged such that a minimal empty volume is formed in the discharge chamber 23 when the beverage item(s) is (are) present. In particular, such volume may be dimensioned to the size of a single beverage item to enable the individual capture of the beverage item by the piston assembly.

The piston assembly 16 further comprises means for opening and re-closing the exchangeable cartridge to control the individual discharge of the beverage item while maintaining a low oxygen content in the interior of the cartridge. For this, the piston comprises a terminal portion 24 arranged for connecting to the closure cap 14 of the exchangeable cartridge. The piston assembly 16 is arranged for moving the piston in such a manner to detach the removable complementary connection 15 and re-connect it after dispensing of the beverage item.

Figure 11:
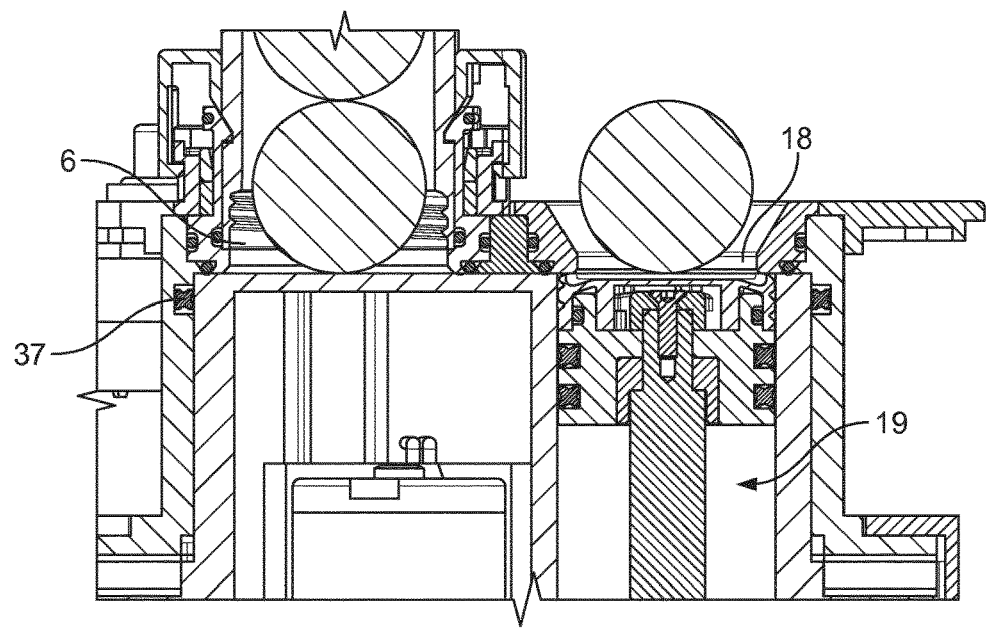
FIG. 11 is an enlarged cross-section view of FIG. 7.
Figure 12:
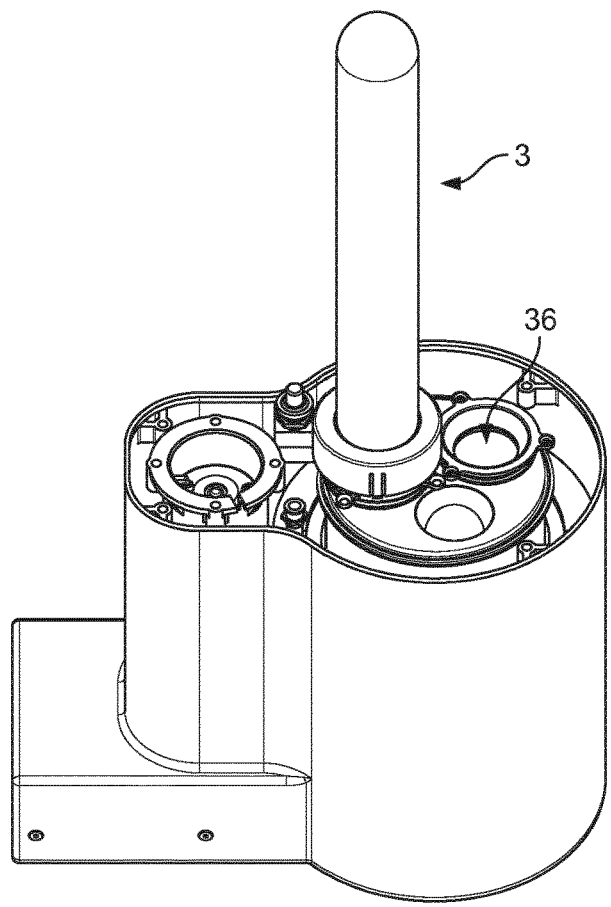
FIG. 12 shows a perspective view of the portioned dispenser system with the frame partly removed in an intermediate position of the piston assembly between the discharge and dispensing positions.
Figure 17:
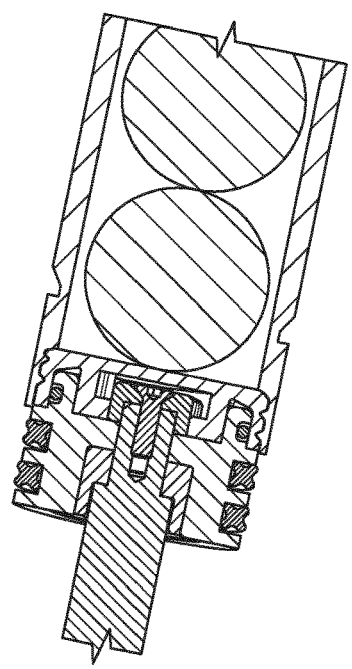
FIG. 17 is a cross-sectional side view of the engagement of the keying member of the piston and the locking member of the closure cap of the exchangeable cartridge.
Figure 18:
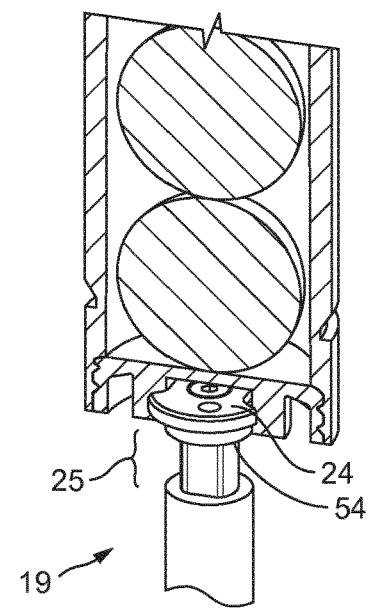
FIG. 18 is a perspective cross-sectional view of the FIG. 17 with the sealing part of the piston removed.

The support surface of the closure cap (i.e. the surface supporting the beverage item for dispensing it through the housing as shown in FIG. 11) is also designed to match the surface of the shutter so that the amount of air that can enter in the cartridge is kept as low as possible. Preferably, the support surface of the closure cap is planar when the shutter is planar.

In particular, the terminal portion 24 of the piston forms part of a keying member 25 arranged for complementary fitting with a locking member 26 of the closure cap. This keying and locking arrangement will be further described in relation to the example of FIGS. 15-21. As a matter of principle, the keying and locking members 25, 26 are configured to provide a connection enabling the closure cap to remain fixed to the piston when the latter moves between the extended position and the retracted position. As a result, the closure cap forms a support for the first beverage item of the pile when the piston is retracted thereby causing the first beverage item to be discharged gently in the discharge chamber accompanied by the piston when the latter is retracted instead of falling in the chamber by gravity. This support during discharge provides the advantage to maintain the integrity of the beverage item such that a proper individual dosing is made possible by the piston assembly.

The opening and re-closing means further comprise a piston actuator 27 arranged for driving the piston in a reciprocal and axial path in the piston housing. Furthermore, the piston actuator 27 is arranged for providing a combined axial and rotation motion along its longitudinal axis (I) to the piston enabling the closure cap attached to the piston to be removed (e.g. unscrewed) from the storage tubular member of the cartridge. For this, the combined axial and rotational motion is arranged to match the threaded path of the complementary connection 15 of the closure cap in the cartridge. The piston actuator 27 may comprise a spindle nut member 28 fixed to the piston housing which engages with a threaded spindle 29 of the piston so as to move the piston reciprocally along an axial and rotational path of axis (I) between the extended and retracted positions. The spindle 29 is driven by a gear mechanism 30, that may be formed of two (or more) pinions, driven by an electrical motor 31. Advantageously, the gear mechanism is arranged such that the electrical motor is positioned parallel to the piston in order to save space in the frame of the dispenser. It should be noted that the gear mechanism can be omitted and the motor can be aligned with the spindle 29 with a direct link to it.

As represented on FIG. 9, the portion dispenser comprises sealing members arranged for providing an effective gastight seal arrangement with the exchangeable cartridge when such is engaged in the receiving portion 5. In particular, a sealing member 32 is provided between the receiving portion 5 and the tubular storage member 7 of the cartridge. The sealing member 32 can be part of or added to the tubular surface 13, for example, to an inner lower part of it. The sealing member 32 may alternatively or additionally be part of the tubular storage member 7. Another sealing member 33 is provided between the receiving portion 5 of the frame or other close part of it and the piston housing 20. Again the sealing member 33 can be part of the receiving portion as illustrated or additionally or alternatively part of the piston housing. At least one other sealing member 34 (actually two sealing members represented in the preferred example) is part of the piston 19 and positioned to engage with the piston housing 20. The sealing members 32, 33 and 34 participate to the sealing connection of the exchangeable cartridge with the piston assembly such that substantially no air coming from outside can possibly enter in the discharge chamber 23 and in the interior of the exchangeable cartridge. The results is that when the closure cap is removed by the piston being retracted, the pressure balance and gas transfer resulting therefrom is only possible between the exchangeable cartridge and the discharge chamber 23. There is substantially no air drawn by the piston retraction coming from outside.

According to another aspect of the portion dispenser, the piston assembly 16 is mounted in the frame 4 to be moveable between the discharge position and a dispensing position. In the illustrated mode, the piston assembly is mounted in a pivotable manner about an axis of rotation Z which is parallel to the axis I of motion of the piston. In the dispensing position, the piston becomes positioned in axial relationship with the dispensing opening 18 (along axis O). The discharge opening 6 and the dispensing opening 18 may both be arranged in parallel axial relationship (essentially vertically) so as to provide a simple movement of the piston assembly, e.g. a pivotal movement, relative to the frame between the two positions. The motion of the piston assembly is driven by a piston assembly actuator 35. The piston assembly actuator may comprise a circumferential pinion 89 fixed to the piston housing, a driving pinion 60 geared to the circumferential pinion and an electrical motor 38.

The piston assembly further comprises a shutter 36 for sealingly closing the discharge opening 6 as the piston is moved to the dispensing area. The shutter is preferably a portion of wall transversally arranged relative to the discharge opening 6 and to the dispensing opening 18. The shutter is arranged for moving together with the piston housing 20 between the discharge opening and the dispensing opening for selectively shutting off the discharge opening or the dispensing opening as soon as the piston housing is displaced out of the discharge opening or the dispensing opening. In the preferred mode, the shutter 36 forms an extension wall of the piston housing that extends transversally to the axis I and O of the openings.

Figure 10:
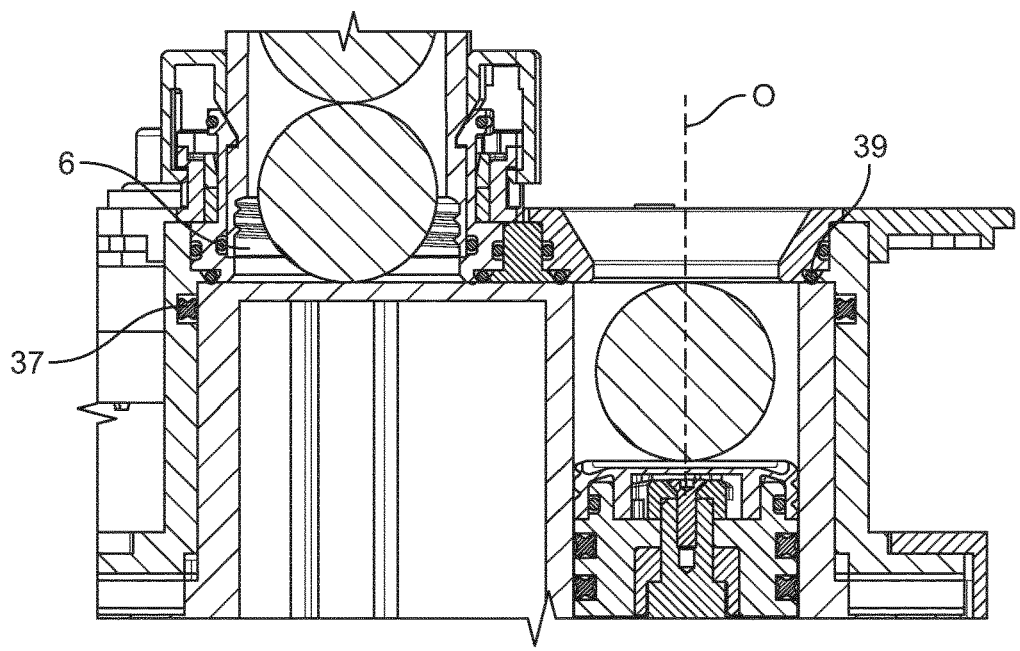
FIG. 10 is an enlarged cross-section view of FIG. 6.

Additional sealing members are provided to further secure the gas tightness of the piston housing. In particular, at least one sealing member 37 can be positioned between the piston housing 20 and the frame 4. The sealing member 37 ensures the tightness of the piston chamber during the rotation of the piston housing 20. Also, at least one sealing member 38 can be positioned between the dispensing opening 18 and the piston assembly. In this case, the sealing member can bear on the wall of the shutter 36 when the dispensing opening is closed, i.e. when the piston housing is not yet aligned with the dispensing opening (FIGS. 9, 11). It also presses on the edge 39 of the piston housing when the piston is aligned with the opening axis O (FIG. 10).

The piston actuator 27 and piston assembly actuator 35 can be automatically controlled by a control unit 40 housed in the frame or in a different part of the dispenser. The control unit is configured to command the actuators in a synchronous manner to provide a correct operation including respectively: the discharge of a beverage item, its dispensing to the dispensing area and the return of the piston assembly to its initial position for a next cycle.

The operation of the portion dispenser can be described in relation to FIGS. 5 to 8.

To start the dispensation cycle of a beverage item, an exchangeable cartridge 3 is connected to the portion dispenser in the receiving portion with its closure cap 14 connected in closure to the tubular storage portion 7. The exchangeable cartridge is locked in the receiving portion 5 by the elastic connection member. The connection can be simply secured by manually pushing the cartridge down towards the dispenser. The elastic connection member is biased until it fits in the annular groove 22 by elastic return. Thus, the cartridge is secured during dispensing and cannot be easily removed.

In this configuration, the interior of the cartridge remains under vacuum or under protected atmosphere. The beverage items are stacked in the cartridge with the lowermost beverage item pressing on the closure cap. The piston assembly lies in an initial position with the piston being in extended position to receive the exchangeable cartridge. In this case, a position sensor may be provided that detects the presence of the exchangeable cartridge and actuate the extension of the piston by the piston actuator accordingly.

Figure 5:
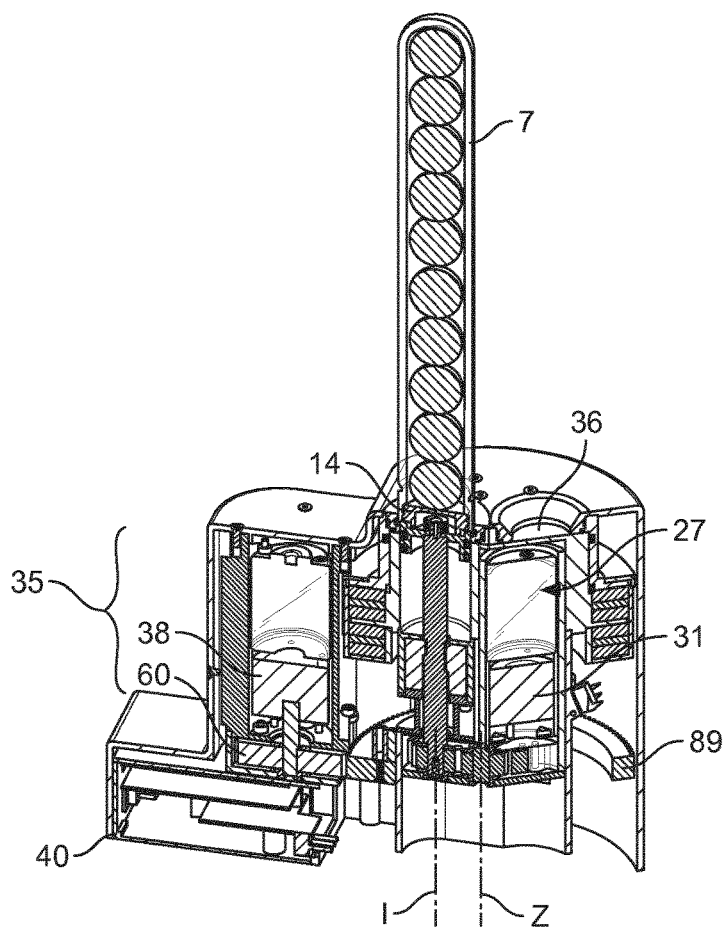
FIGS. 5 to 8 illustrate in perspective cross-sectional views the principle of kinematic of the portion dispenser according to a first embodiment.

In the position of FIG. 5, the keying member 25 of the piston is engaged in the locking member the closure cap. The engagement may start with a simply axial insertion of the keying member in the locking member, e.g., when the user inserts the cartridge in the receiving portion of the dispenser, as will be further discussed in relation to FIGS. 17 and 18.

In the next step illustrated in FIG. 6, the piston is actuated in the retraction position. The control unit 40 commands the piston actuator 27 accordingly and the piston is moved downwards in a combined axial and rotational motion. At the start of such motion, the keying member 25 of the terminal portion of the piston locks up automatically in the locking member of the closure cap thereby ensuring the axial connection of the two. This locking is obtained by the combined movement of the keying member 25 while the locking member remains stationary as will be explained further in detail in relation to FIGS. 14 to 21. As the piston is retracted along the spindle, the keying member applies a combined rotational and axial force in the locking member to remove, e.g. unscrew, the closure cap 14 from the tubular storage member of the cartridge. As the piston retracts, the closure cap is entrained and lowers down with a beverage item supported thereon. The beverage items is received in the discharge chamber 23 formed by the retracted piston and piston housing.

Figure 7:
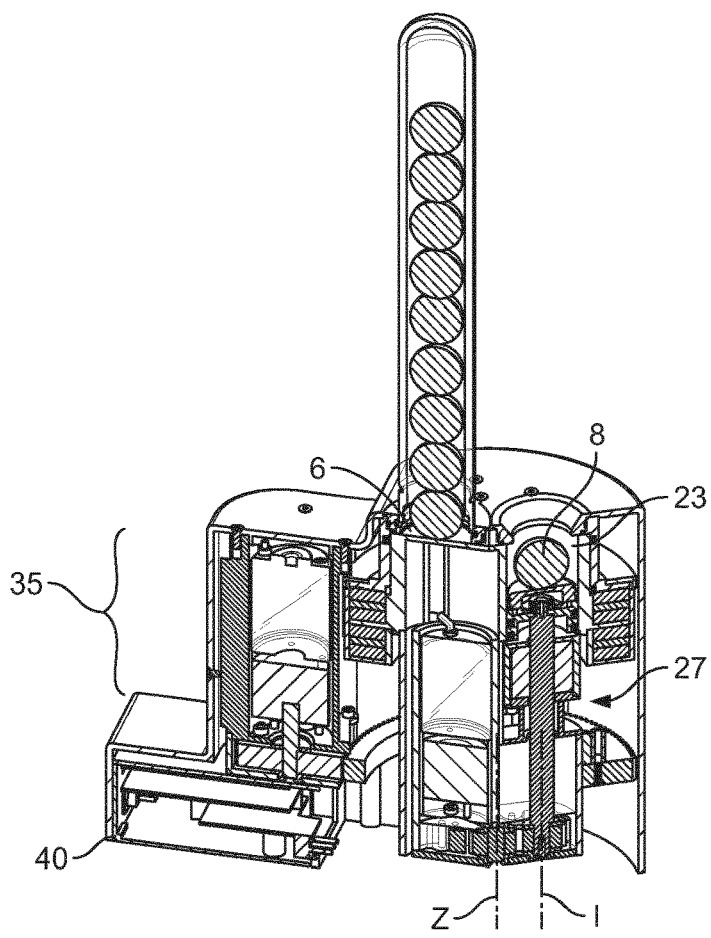

In the next step illustrated in FIG. 7, the piston assembly 16 is actuated in rotation thereby transporting the selected beverage item 8 in the discharge chamber 23 accordingly. The control unit commands the piston assembly actuator 35 accordingly while the piston remains in the retracted position during this stage. The discharge opening 6 is shut off by the shutter 36 sliding transversally as soon as the piston moves away from the discharge opening. As the shutter moves to the shutting-off arrangement of the discharge opening, a sealing arrangement is obtained between the shutter and the receiving portion by seal 33 (as illustrated in FIG. 13). As a result, the exposure of the interior of the cartridge to the ambient is essentially prevented.

Figure 8:
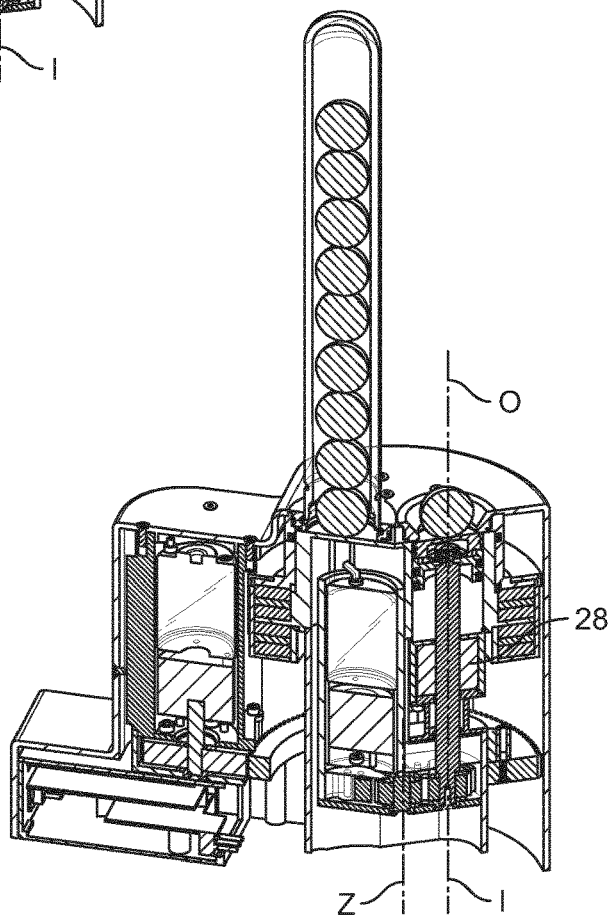

In the next step illustrated in FIG. 8, the piston is actuated in the extended position. The control unit commands the piston actuator accordingly and the piston is moved upwards along the spindle up to a point where the beverage item lies in the dispensing area, e.g., extends beyond or through the dispensing opening. It should be noted that the dispensing area may be a beverage brewing area or a handling area.

In the next step, the piston assembly is returned to the initial position for a new cycle.

FIGS. 14 to 21 provides a first embodiment of a keying and locking arrangement according to the invention. In this example, the closure cap 14 comprises a thread portion 41 as part of the removable complementary connection. A complementary thread portion is provided in the tubular storage member. It should be noted that the connection could be any other equivalent connection means such as a bayonet-type connection or equivalent. The locking member 26 of the closure cap comprises a receiving cavity 42 for the terminal portion 24 of the keying member 25. The locking member further comprises an entry passage 43 communicating with the receiving cavity. The entry passage has a smaller cross-section than the receiving cavity. The entry passage is arranged with a shape similar but slightly larger than the shape of the terminal portion in such a manner that the terminal portion can be inserted through the entry passage in a privilege rotational orientation illustrated in FIGS. 17 and 18. For instance, the entry passage has substantially two opposed arc-shaped portions 44, 45 interrupted by a pair of opposed protrusion surfaces 46, 47 extending towards the center of the passage. The receiving cavity 42 has essentially two opposed arc-shaped annular portions 62, 63 interrupted by a pair of stepped protrusions 48, 49. Each stepped protrusion is formed by an innermost protrusion portion 50 and an outermost protrusion portion 51 of substantially similar shape but which are slightly radially offset one another. In a plane view, the contour of the stepped protrusions is essentially covered by the opposed protrusion surfaces 46, 47 of the entry passage. Each protrusion is arranged in the cavity to form respectively first and second radial abutment surfaces 52, 53 for the terminal portion of the closure cap by the piston.

Figure 19:
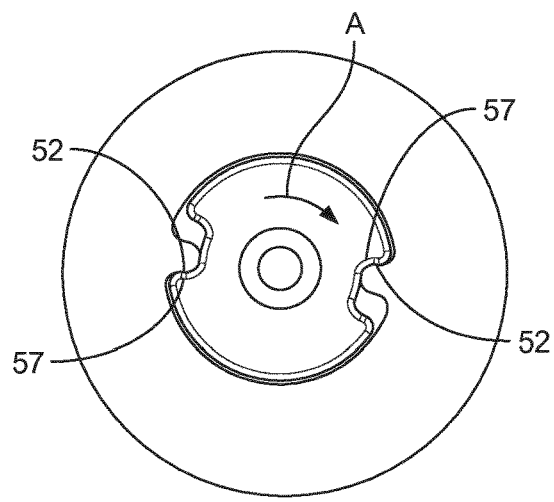
FIG. 19 is a perspective cross-section view in plane A-A of the closure cap showing the engagement of the keying member during removal, i.e. unscrewing of the closure cap by the piston.
Figure 20:
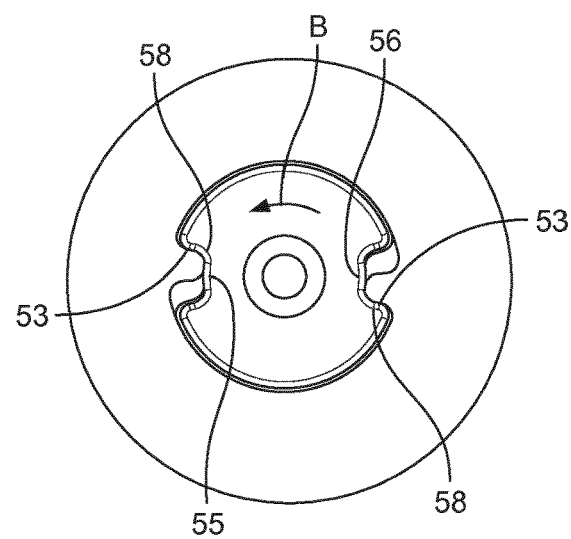
FIG. 20 is a perspective cross-section view along A-A of the closure cap showing the engagement of the keying member during re-connection, i.e. screwing of the closure cap by the piston.
Figure 21:
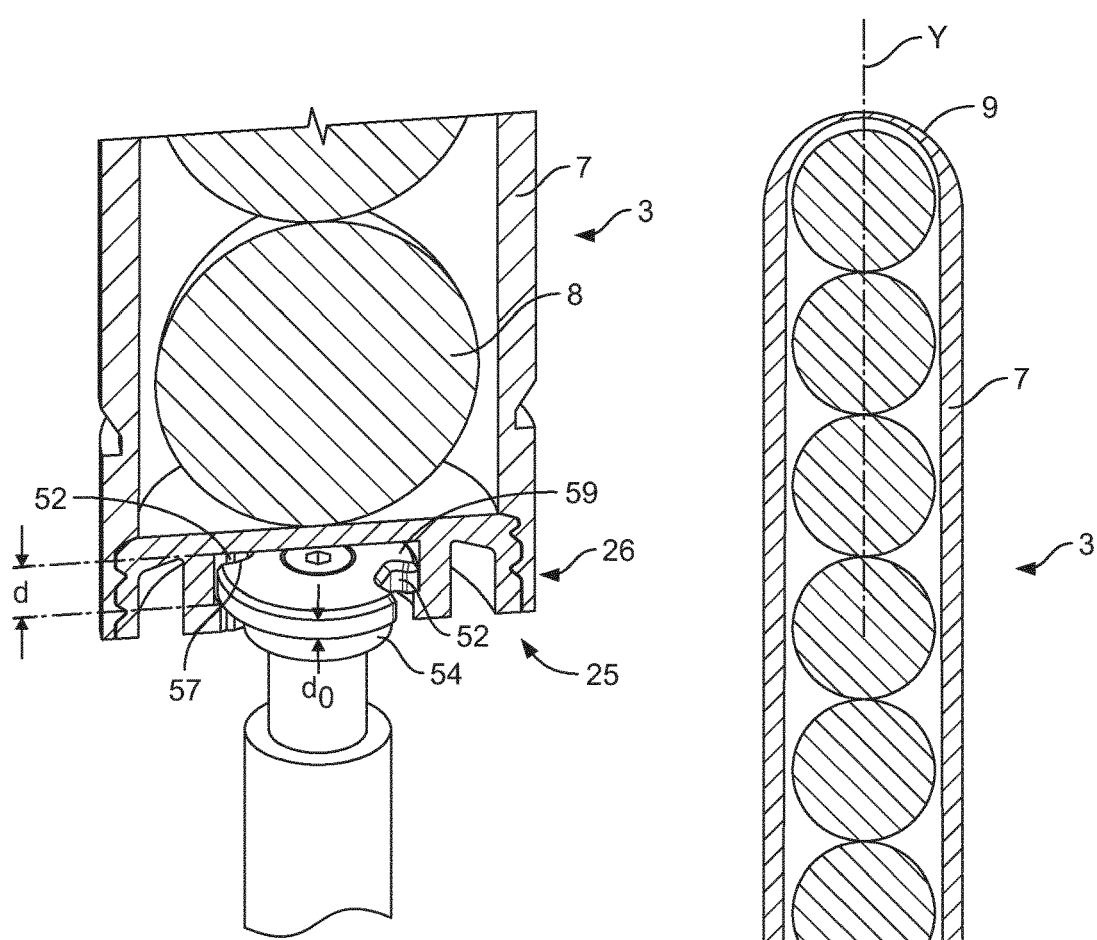
FIG. 21 is a perspective cross-sectional view of FIG. 20.

On the keying member 25 of the piston, the terminal portion 24 forms an enlarged surface substantially matching the shape of the entry passage. The terminal portion connects outwardly by a reduced surface 54 narrower than the entry passage so as to not hinder with it during rotation of the keying member. The terminal portion of the keying member comprises a pair of opposed recesses 55, 56 configured for allowing passage of the terminal portion through the entry passage. Each recess comprises a first radial abutment surface 57 adapted to be engaged by the first abutment surface 52 of the locking member and a second radial abutment surface 58 adapted to be engaged by the second abutment surface 53 of the locking member. As shown in FIG. 19, the first abutment surfaces 52, 57 of the members abut with each other when the keying member unscrews the locking member (in rotational direction A) to remove the closure cap from the exchangeable cartridge. As shown in FIG. 20, the second abutment surfaces 53, 58 abut with each other when the keying member screws the locking member (in rotational direction B) to re-close the closure cap to the exchangeable cartridge. In FIG. 21, it is possible to view the abutment surfaces 52 of the keying member when forcing against the abutment surfaces 57 of the locking member during the unscrewing operation of the closure cap. It should be further noticed that the depth "d" of the receiving cavity 42 is much larger than the thickness "do" of the terminal portion with a sufficient gap 59 to prevent blocking of the keying member with the locking member during operation.

In this embodiment, a mechanical inversion is possible in that the locking member is part of the beverage item dispenser and the keying member is part of the closure cap.

Figure 25:
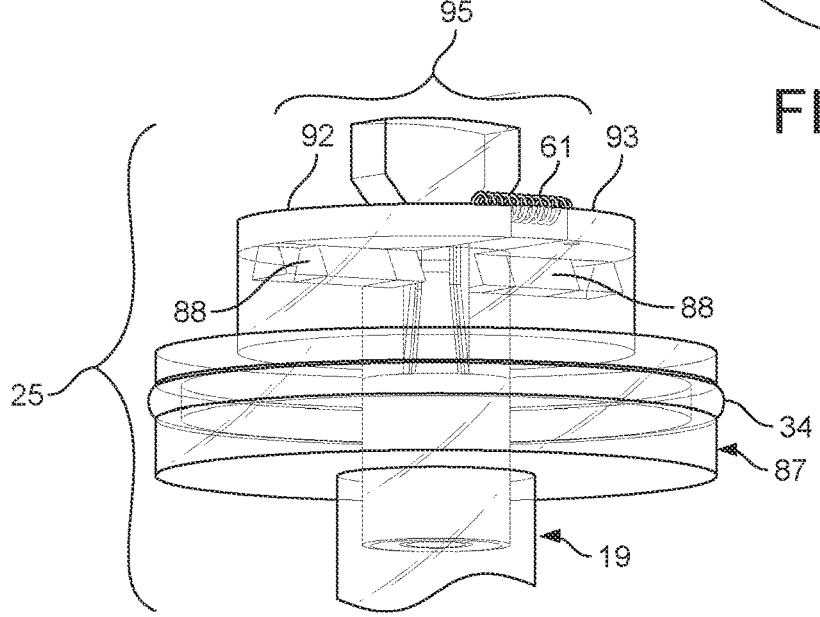
FIG. 25 is perspective view of the keying member of the portion dispenser arranged for engaging with the closure cap of the second embodiment of FIGS. 22 to 24.
Figure 27:
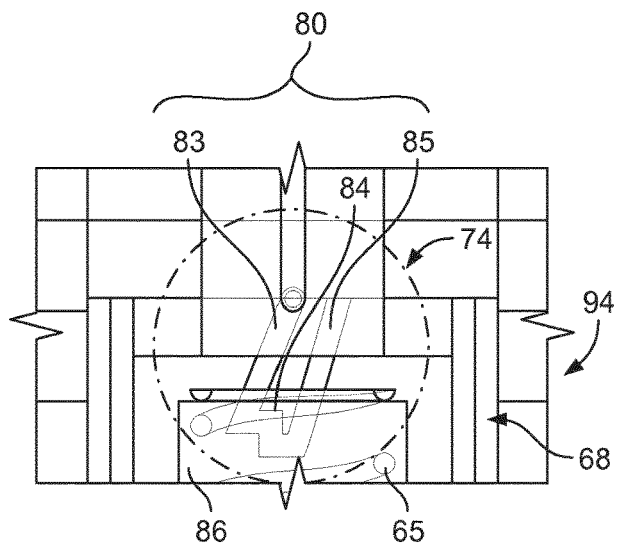
FIG. 27 is an enlarged cross-sectional view of the keying member of FIG. 25.
Figure 28:
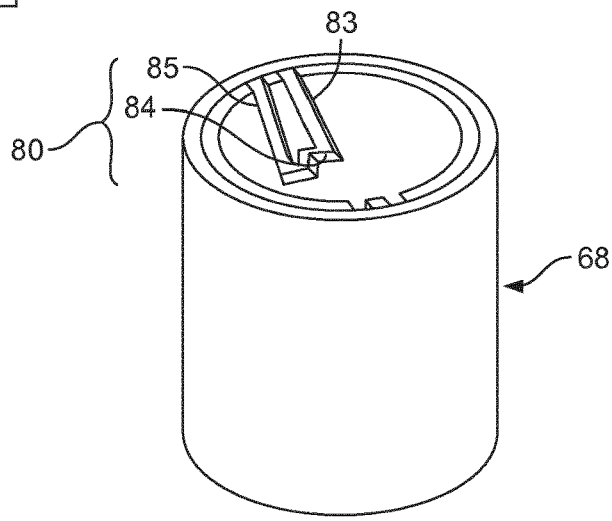
FIG. 28 is a perspective view of the jacket of the keying member of FIG. 25.
Figure 29:
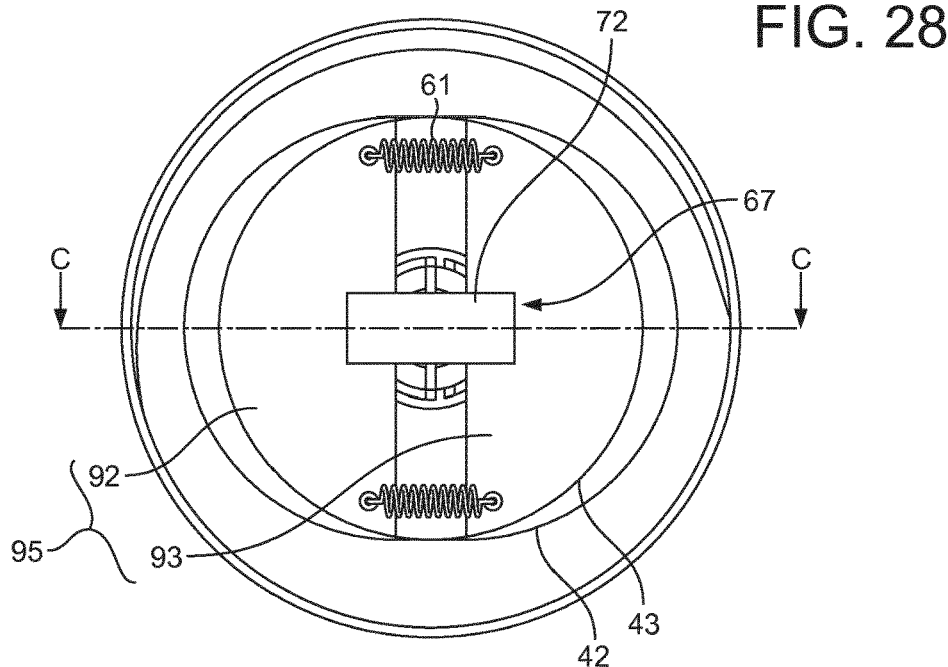
FIG. 29 is a cross-sectional view in plane A-A of the closure cap with the keying member of the piston inserted in the locking member of the closure cap in neutral position (i.e. not yet actuated in locking position)
Figure 30:
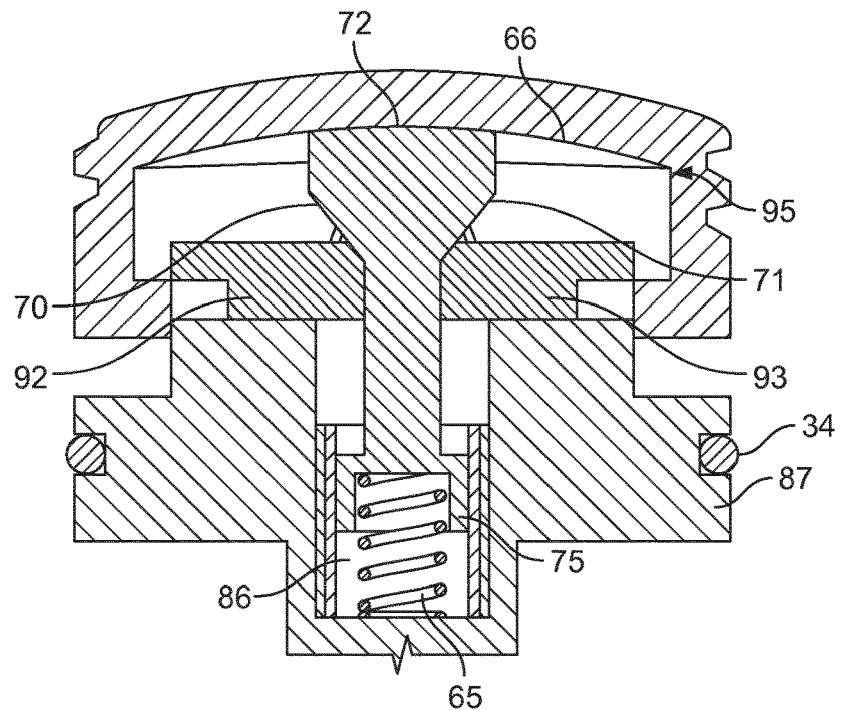
FIG. 30 is a cross-sectional view in plane C-C of the locking system in neutral position of FIG. 29.

FIGS. 23 to 32 illustrate a second embodiment of the locking system of the dispenser system. The locking member 26 comprises a receiving cavity 42 with a shape which is elongated preferably oblong. The receiving cavity is arranged for receiving an expandable terminal portion 24 of the keying member 25 as illustrated in FIGS. 25 and 29-30. The locking member 26 comprises an entry passage 43 of circular opening which is smaller than the larger dimension L of the receiving cavity thereby providing an inner shoulder 64 e.g. a pair of opposite shoulder surfaces 90, 91, enabling an axial engagement of the terminal portion 24 of the keying member when the closure cap 14 is removed, e.g. unscrewed, from the tubular member of the cartridge.

Figure 31:
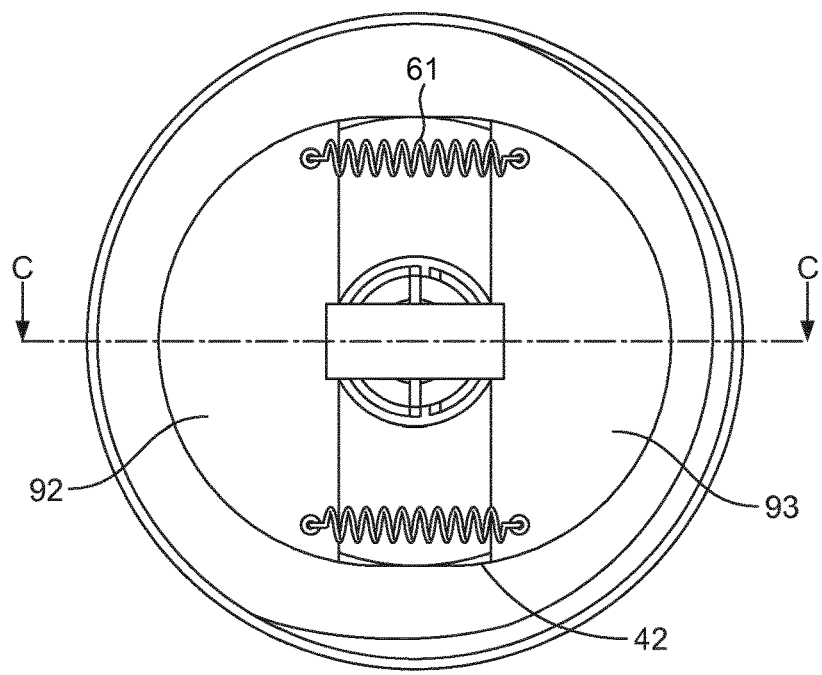
FIG. 31 is cross-sectional view in plane A-A of the closure cap with the keying member of the piston inserted in locking position in the locking member to remove (e.g. unscrew) the closure cap.
Figure 32:
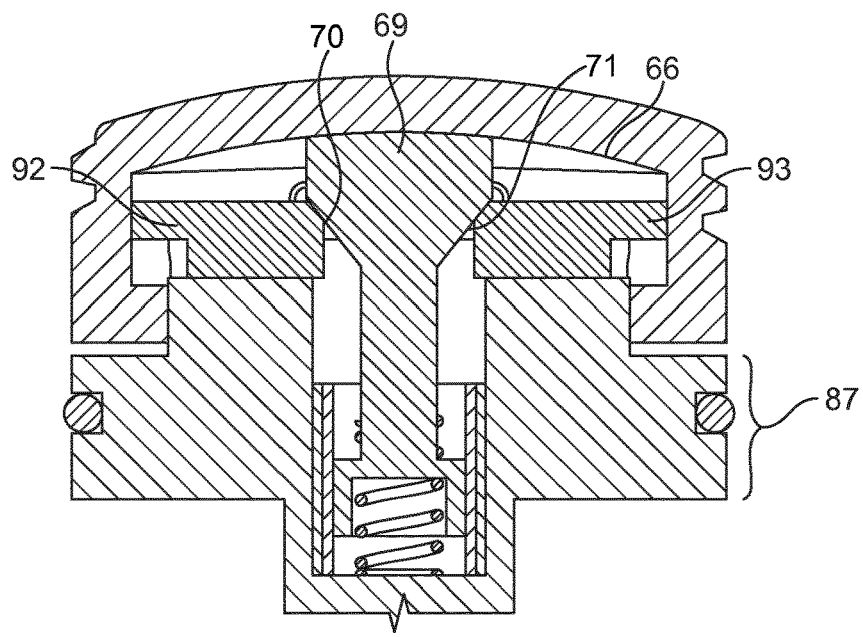
FIG. 32 is a cross-sectional view in plane C-C of the locking system of FIG. 31.
Figure 33:
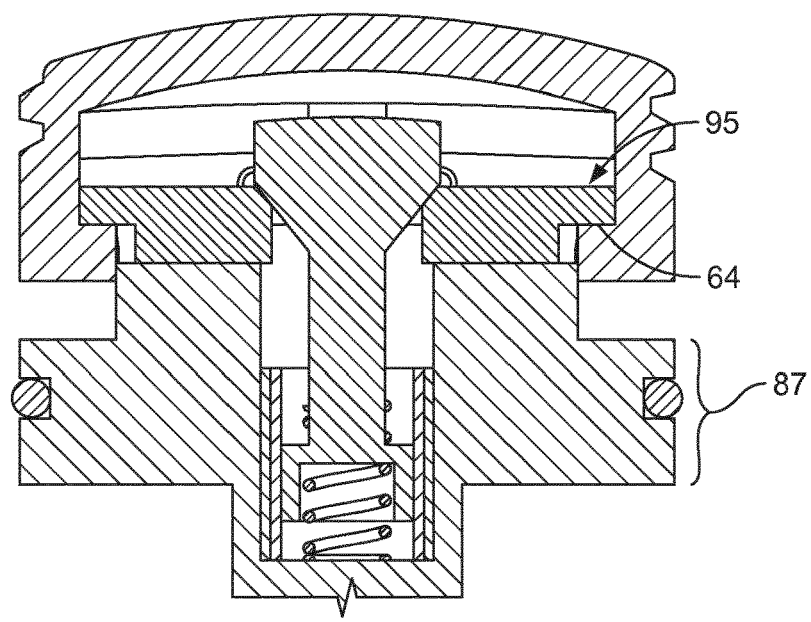
FIG. 33 is a cross-sectional view in plane C-C of the locking system as in FIG. 32 but in the following operation of pulling the closure cap.
Figure 34:
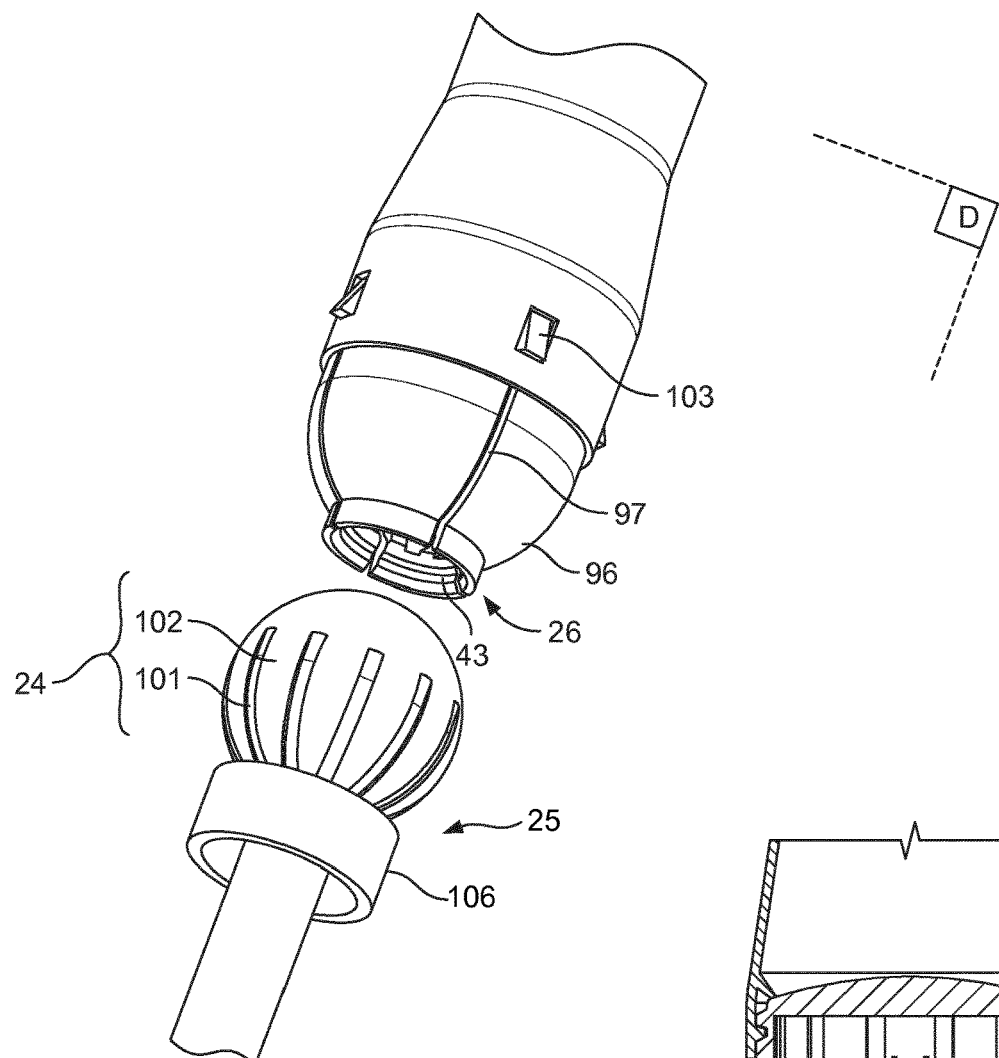
FIG. 34 is a perspective view of the locking system with the closure cap and locking member of the piston before coupling according to a third embodiment.
Figure 35:
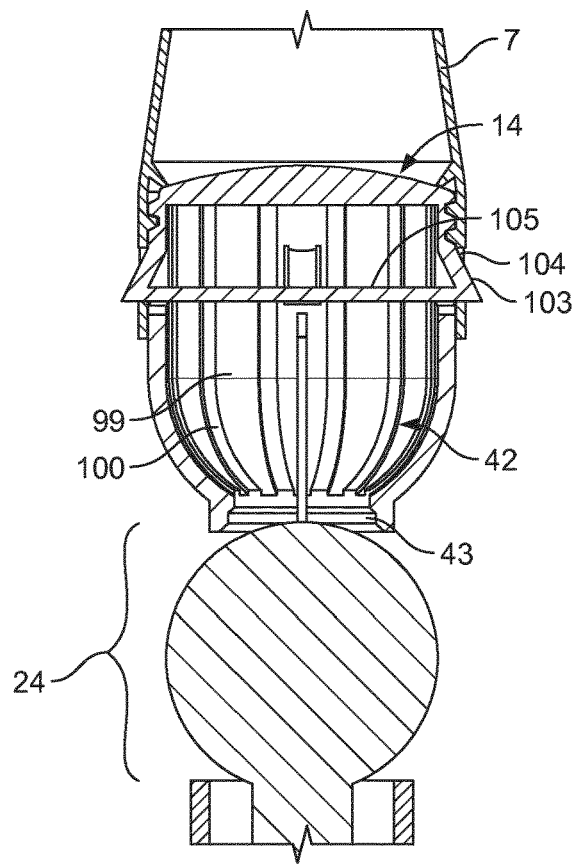
FIG. 35 is a cross-section in plane D of the locking system of FIG. 32.

As illustrated in FIGS. 31 to 33, the terminal portion of the keying member of the dispenser device is arranged to be expandable after insertion in the locking member. As preferred example illustrated in FIGS. 25 to 28, the terminal portion of the keying member comprises an expandable engaging member 95 e.g. comprising a pair of disc halves 92, 93 capable of being inserted through the entry passage 43 of the locking member and of being moved apart transversally inside the receiving cavity 42 to secure the keying member to the locking member of the closure cap. The keying member comprises an actuating system 94 arranged for actuating the engaging member 95 between its locking position (FIG. 31) and its releasing position (FIG. 29). The pair of disc halves can be linked by return elastic means such as a pair of traction springs 61 for forcing the return of the disc halves in releasing position (FIG. 29).

Figure 26:
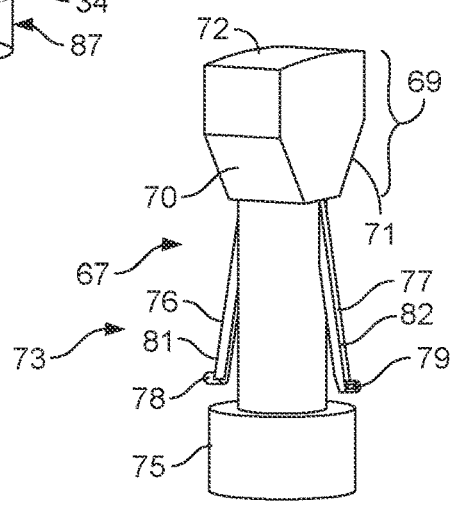
FIG. 26 shows a detail of the keying member of FIG. 25, in particular, the actuator of an actuating system.

FIGS. 26 to 28 show in more detail a preferred actuating system 94 for the keying member. The actuating system may comprise an actuator 67 mounted in movable manner and elastically in a cylindrical jacket 68. The actuator comprises an actuating head 69 comprising engaging surfaces 70, 71 arranged for engaging against the engaging member 95, more particularly against the two disc halves 92, 93. The disc halves are preferably guided by a pair of radial dovetail ridges 88 fitting in complementary radial dovetail grooves of the jacket 68. The head of the actuator further comprises a top end 72 for engaging with the bottom surface 66 of the receiving cavity of the closure cap (FIG. 30). The actuator 67 comprises a cam follower 73 which is arranged for being guided in a cam 74 of the jacket 68. The cam follower and cam are designed to guide the actuator axially in the jacket between an extended position (FIG. 30) and a retracted position (FIG. 32). The actuator is further axially pressed against the force of an elastic member 65 positioned in the jacket. The elastic member 65 can press against a bottom portion 75 of the actuator and be housed in housing 86 provided in an enlarged base 87 of the jacket. The enlarged base 87 can comprise a peripheral sealing member 34 to sealingly move in the piston housing of the dispenser as described earlier.

The cam follower can be formed of a pair of arms 76, 77 comprising free ends 78, 79 which are received in opposite cam paths 80. The arms further comprise flexible portions 81, 82 enabling the arms to follow the cam paths. The cam paths are designed with a descending portion 83, a stopping portion 84 and an ascending portion 85 providing a guiding reciprocal movement to the actuator between the extended and retracted positions while the stable retracted position being obtained by the stopping portion 84.

In the configuration of FIGS. 29 and 30, the keying member of the piston can be inserted in the locking member of the closure cap as the engaging member 95 is in retracted position with the disc halves 92, 93 form a smaller section than the section of the entry passage 43. The user can position an exchangeable cartridge in the dispenser while the keying member of the piston positions itself freely in the locking member of the closure cap during such positioning or during a subsequent operation.

As illustrated in FIGS. 31 and 32, when the actuating system 94 forces the engaging member 95 in expanding configuration in the locking member, the engaging surfaces 70, 71 force the disc halves 92, 93 to move apart from each other and to take substantially the volume of the receiving cavity 42 thereby blocking the keying member in the locking member. In such position, the actuator is also locked in its axial extended position. The system being thereby well secured, when the piston is moved in the combined axial and rotational movement, torque can be transmitted by the keying member to the closure cap to be unscrewed. When the piston is moved axially, the disc halves of the engaging member 95 abut on the shoulder 64 (FIG. 33) thereby contributing to remove the closure cap from the tubular storage member.

The releasing position of the engaging member 95 is obtained when the axial force exerted by the piston is stopped causing the actuator to return to its rest position (FIG. 30) and the disc halves to be forced in their releasing position by the return elastic means, i.e. the pair of traction springs 61.

Figure 36:
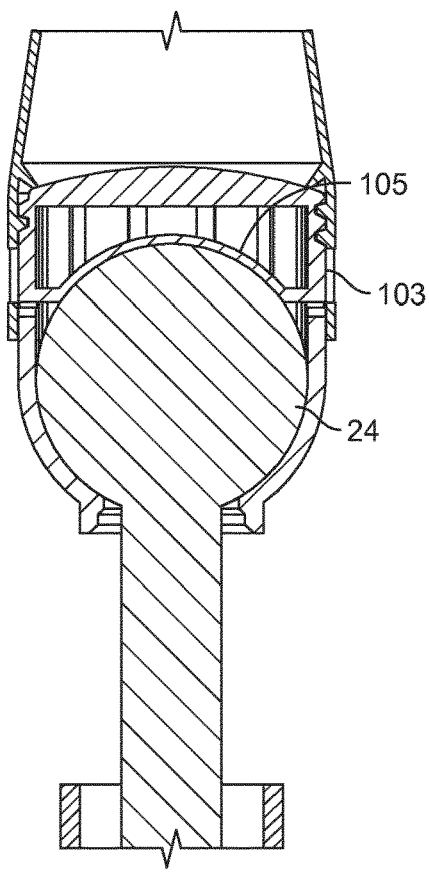
FIG. 36 is a cross-section in plane D of the locking system of FIG. 33 in locking position.

FIGS. 34 to 37 illustrate a third embodiment of the locking system of the dispenser system. The locking member 26 comprises a hollow receiving cavity 42 of deformable character and an entry passage 43 of smaller transversal cross-section than the transversal cross section of the terminal portion 24 of the keying member. For example, the receiving cavity comprises expandable portions of walls 96 separated by longitudinally extending channels 97 for expanding the receiving cavity upon insertion of the terminal portion. The terminal portion 24 may have a rounded or ball-like shape to reduce friction during insertion in the cavity. The receiving cavity comprises radially arranged first and second engagement surfaces forming longitudinally extending grooves 99, or respectively ribs 100, at its inner surface arranged for fitting with complementarily shaped with ribs 101, respectively longitudinally extending grooves 102, at the outer surface of the terminal portion of the keying member 26 (FIG. 36).

Figure 37:
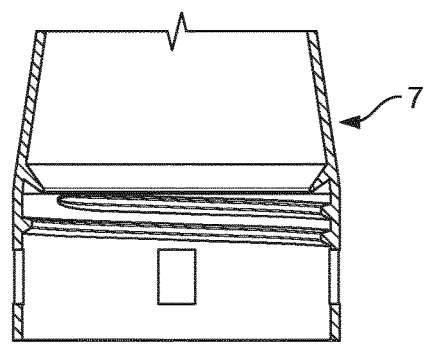
FIG. 37 is a cross-section in plane D of the locking system of FIG. 33 after removal of the closure cap.
Figure 37:
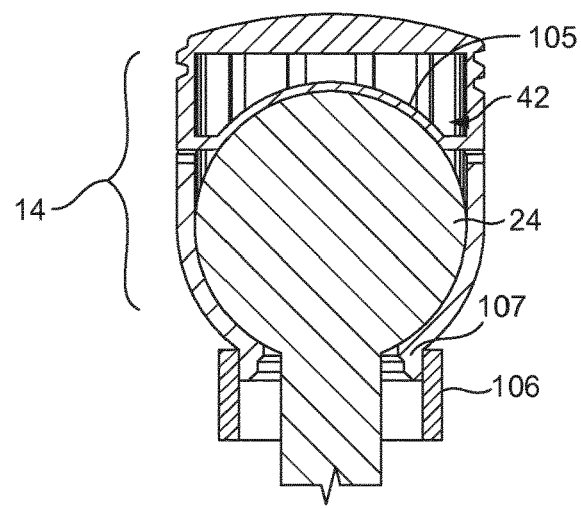

The connection of the closure cap comprises a thread as for the previous embodiment or any equivalent connection means and may further comprises on its outer tubular surface outwardly oriented and retractable tongues 103 arranged for engaging complementarily shaped through-openings 104 of the open end of the tubular member. An elastic actuation member 105 may be arranged across the receiving cavity 42 for being engaged by the terminal portion 24 of the keying member to force the tongues 103 to retract upon engagement of the terminal portion in the receiving cavity (FIG. 36). The actuation member 105 can be an elastically deformable wall which is deformed inwardly by the terminal portion of the keying member. As illustrated in FIG. 37, the keying member is moved by the piston 19 to unscrew or re-screw the closure cap 14 from the tubular storage member 7 of the exchangeable cartridge. The keying portion 25 may further comprise a locking ring 106 which engages an annular end 107 of the keying member 26 to prevent the expandable portions of walls 96 from expanding and the keying member from opening when torque is applied to the closure cap by the piston. As for the two other embodiment, this locking system can be applied to the portion dispenser system described in the present application.

The invention claimed is:

1. An exchangeable cartridge for a portion dispenser arranged for storing and dispensing a plurality of beverage items for the preparation of beverages, the exchangeable cartridge comprising:
   an elongated hollowed storage member comprising an interior configured to hold the plurality of beverage items, the elongated hollowed storage member comprising a closed end and an open end, the open end comprising an exit opening, and
   a closure cap adapted to connect in a removable manner to the elongated hollowed storage member at the open end of the elongated hollowed storage member and to be sealed to the elongated hollowed storage member through a removable complementary connection,
   the closure cap comprises a locking member configured to complementarily fit with a keying member of the portion dispenser, allowing the closure cap to be removed from the elongated hollowed storage member when connected to the portion dispenser and to be re-connected to the elongated hollowed storage member before being disconnected from the portion dispenser,
   the locking member comprises a receiving cavity of non-circular shape for receiving an expandable terminal portion of the keying member, and the locking member further comprises an entry passage for selective insertion of the expandable terminal portion of the keying member.

2. The exchangeable cartridge according to claim 1, wherein the interior of the elongated hollowed storage member is protected from ambient air and/or moisture, and the elongated hollowed storage member and closure cap are sealingly closed in such a manner to prevent exchange of gas with the ambient air when the closure cap is in a sealed connecting position with the elongated hollowed storage member.

3. The exchangeable cartridge according to claim 1, wherein the interior of the elongated hollowed storage member is protected from UV light in order to preserve the plurality of beverage items from the effects of UV light.

4. The exchangeable cartridge according to claim 1, wherein the plurality of beverage items are spherical and essentially made of a compacted ingredient selected from the group consisting of powder, flakes, fibers, leaves, fruit pieces and combinations thereof.

5. The exchangeable cartridge according to claim 1, wherein the plurality of beverage items are essentially made of compacted powder having a density between 0.5 and 1.2 g/cm$^3$.

6. The exchangeable cartridge according to claim 1, wherein the plurality of beverage items are essentially made of compacted roast and ground coffee.

7. The exchangeable cartridge according to claim 1, wherein the plurality of beverage items are essentially made of compacted soluble coffee or tea.

8. The exchangeable cartridge according to claim 1, wherein the plurality of beverage items are free of non-food material cover.

9. The exchangeable cartridge according to claim 1, wherein the closure cap and the elongated hollowed storage member are connected in a force-fitting and/or form-fitting manner.

10. The exchangeable cartridge according to claim 1, wherein the removable complementary connection comprises a thread of the closure cap arranged with a complementary thread of the elongated hollowed storage member.

11. The exchangeable cartridge according to claim 1, wherein the receiving cavity comprises a first engagement surface for torque transmission by the terminal portion of the keying member, the torque transmission releasing the closure cap from the elongated hollowed storage member.

12. The exchangeable cartridge according to claim 11, wherein the locking member comprises a second engagement surface transversally or radially arranged relative to the opening of the elongated hollowed storage member, and the second engagement surface is configured for torque transmission by the keying member for re-connecting the closure cap to the elongated hollowed storage member.

13. The exchangeable cartridge according to claim 12, wherein the first engagement surface and the second engagement surface protrude internally from the receiving cavity towards a center of the receiving cavity and wherein the first engagement surface and the second engagement surface are positioned opposite to each other for being engaged selectively depending on a direction of rotation of the keying member.

14. The exchangeable cartridge according to claim 1, wherein the entry passage comprises a circular opening smaller than a larger dimension of the receiving cavity, and the entry passage provides an inner shoulder enabling an axial engagement of the expandable terminal portion of the keying member during removal of the closure cap.

15. The exchangeable cartridge according to claim 1, wherein an outer surface of the closure cap comprises outwardly oriented and retractable tongues arranged for engaging complementarily shaped through-openings of the open end of the elongated hollowed storage member, the receiving cavity of the locking member comprises an elastic actuation member arranged across the receiving cavity, and the elastic actuation member is configured for being engaged by the expandable terminal portion of the keying member to retract the tongues upon engagement of the expandable terminal portion in the receiving cavity.

16. An exchangeable cartridge for a portion dispenser arranged for storing and dispensing a plurality of beverage items for the preparation of beverages, the exchangeable cartridge comprising:
   an elongated hollowed storage member comprising an interior configured to hold the plurality of beverage items, the elongated hollowed storage member comprising a closed end and an open end, the open end comprising an exit opening, and
   a closure cap adapted to connect in a removable manner to the elongated hollowed storage member at the open end of the elongated hollowed storage member and to be sealed to the elongated hollowed storage member through a removable complementary connection,
   the closure cap comprises a locking member configured to complementarily fit with a keying member of the portion dispenser, allowing the closure cap to be removed from the elongated hollowed storage member when connected to the portion dispenser and to be re-connected to the elongated hollowed storage member before being disconnected from the portion dispenser,
   the locking member comprises a hollow receiving cavity of a deformable character for receiving a terminal portion of the keying member, and the locking member further comprises an entry passage for selective insertion of the terminal portion of the keying member, a transversal cross-section of the entry passage is smaller than a transversal cross-section of the hollow receiving cavity and a transversal cross-section of the terminal portion of the keying member, and the deformable character of the hollow receiving cavity is configured for expanding the receiving cavity upon insertion of the terminal portion.

17. The exchangeable cartridge according to claim 16, wherein the hollow receiving cavity comprises radially arranged first and second engagement surfaces forming longitudinally extending grooves at an inner surface of the hollow receiving cavity, and the longitudinally extending grooves are complementarily shaped with longitudinally extending ribs at an outer surface of the terminal portion of the keying member.

* * * * *